United States Patent
Nakashima et al.

(10) Patent No.: US 9,853,739 B2
(45) Date of Patent: Dec. 26, 2017

(54) OPTICAL TRANSMITTER AND METHOD FOR CONTROLLING BIAS OF OPTICAL MODULATOR

(71) Applicant: FUJITSU LIMITED, Kawasaki-shi, Kanagawa (JP)

(72) Inventors: Hisao Nakashima, Kawasaki (JP); Takeshi Hoshida, Kawasaki (JP); Yuichi Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/738,234

(22) Filed: Jun. 12, 2015

(65) Prior Publication Data
US 2016/0036533 A1  Feb. 4, 2016

(30) Foreign Application Priority Data
Jul. 31, 2014 (JP) ................. 2014-156114

(51) Int. Cl.
| | |
|---|---|
| *H04B 10/50* | (2013.01) |
| *H04B 10/556* | (2013.01) |
| *G02F 1/01* | (2006.01) |
| *G02F 1/225* | (2006.01) |
| *G02F 1/21* | (2006.01) |

(52) U.S. Cl.
CPC ....... *H04B 10/5563* (2013.01); *G02F 1/0123* (2013.01); *G02F 1/2255* (2013.01); *H04B 10/50575* (2013.01); *G02F 2001/212* (2013.01)

(58) Field of Classification Search
CPC .............................. H04B 10/50575
See application file for complete search history.

(56) References Cited

U.S. PATENT DOCUMENTS

| | | |
|---|---|---|
| 2001/0007508 A1 | 7/2001 | Ooi et al. |
| 2007/0065161 A1 | 3/2007 | Miura et al. |
| | (Continued) | |

FOREIGN PATENT DOCUMENTS

| | | |
|---|---|---|
| EP | 1004920 A2 | 5/2000 |
| EP | 1462848 A2 | 9/2004 |
| | (Continued) | |

OTHER PUBLICATIONS

Andreas Leven, et al., "Frequency Estimation in Intradyne Reception", IEEE Photonics Technology Letters, vol. 19, No. 6, pp. 366-368, Mar. 15, 2007 (3 pages).
(Continued)

*Primary Examiner* — Shi K Li
(74) *Attorney, Agent, or Firm* — Fujitsu Patent Center

(57) ABSTRACT

An optical transmitter includes: a mapper that generates an electric field information signal from transmission data; a phase rotation circuit that adds a phase rotation to the electric field information signal; a driver that generates a driving signal from the electric field information signal to which the phase rotation is added; a modulator that generates a modulated optical signal according to the driving signal; and a controller that controls a bias of the modulator according to a change in a carrier frequency of the modulated optical signal corresponding to the phase rotation that is added to the electric field information signal by the phase rotation circuit.

12 Claims, 24 Drawing Sheets

(56) References Cited

U.S. PATENT DOCUMENTS

| | | | |
|---|---|---|---|
| 2011/0305457 A1* | 12/2011 | Kikuchi | H04B 10/5055 |
| | | | 398/65 |
| 2012/0128289 A1 | 5/2012 | Kuwahara | |
| 2012/0155880 A1* | 6/2012 | Nishimoto | H04B 10/50572 |
| | | | 398/79 |
| 2014/0334829 A1 | 11/2014 | Akiyama | |
| 2016/0282699 A1* | 9/2016 | Gottwald | H04B 10/50577 |

FOREIGN PATENT DOCUMENTS

| | | |
|---|---|---|
| JP | 2000-162563 | 6/2000 |
| JP | 2007-82094 | 3/2007 |
| WO | 2013/114628 A1 | 8/2013 |

OTHER PUBLICATIONS

Lei Li, et al., "Wide-Range, Accurate and Simple Digital Frequency Offset Compensator for Optical Coherent Receivers", in Optical Fiber Communication Conference and Exposition and the National Fiber Optic Engineers Conference, OSA Technical Digest (CD) (Optical Society of America, 2008), paper OWT4. http://www.opticsinfobase.org/abstract.cfm?URI=OFC-2008-OWT4 (3 pages).
EESR—The Extended European Search Report issued in corresponding to European Patent application No. 15171377.3 dated Jan. 7, 2016.

* cited by examiner

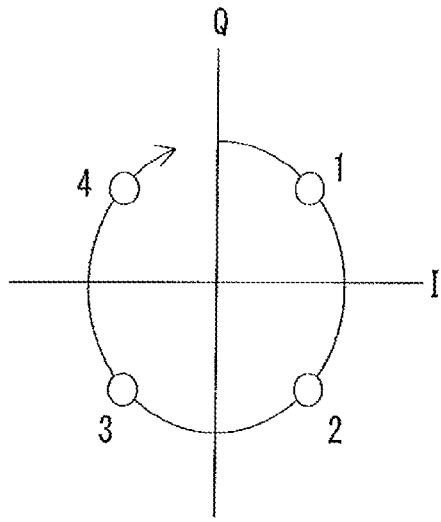
IN A CASE IN WHICH I-ARM AND Q-ARM
OPERATE AT THE SAME NULL POINT
F I G. 3 A
IN A CASE IN WHICH I-ARM AND Q-ARM
OPERATE AT DIFFERENT NULL POINTS

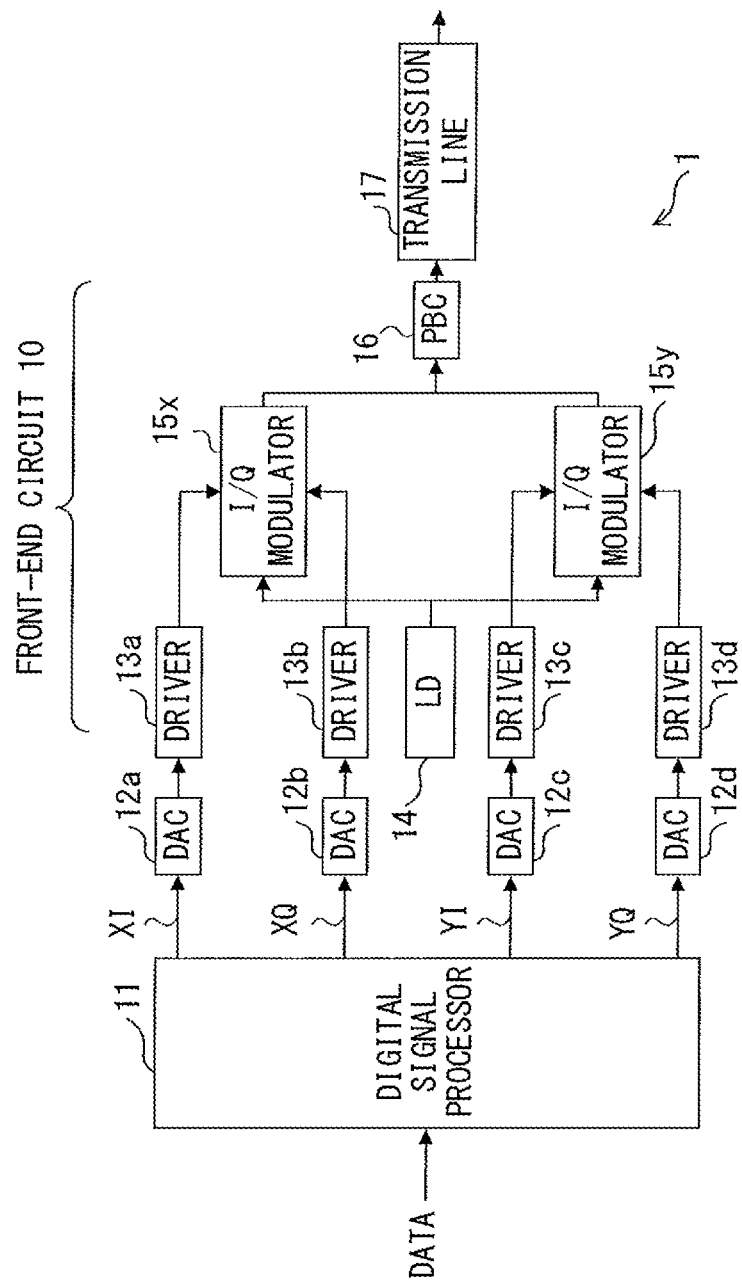
F I G. 4

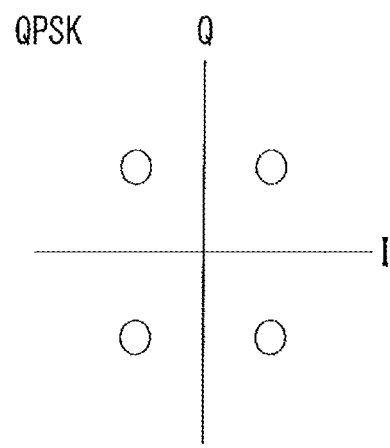
F I G. 7A
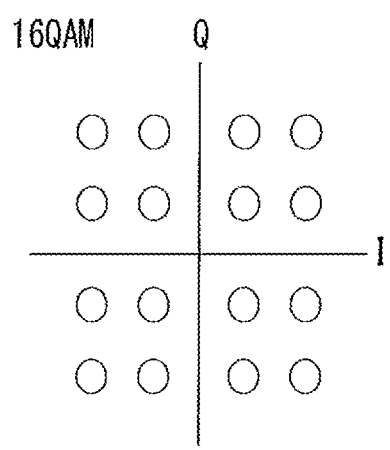
F I G. 7B

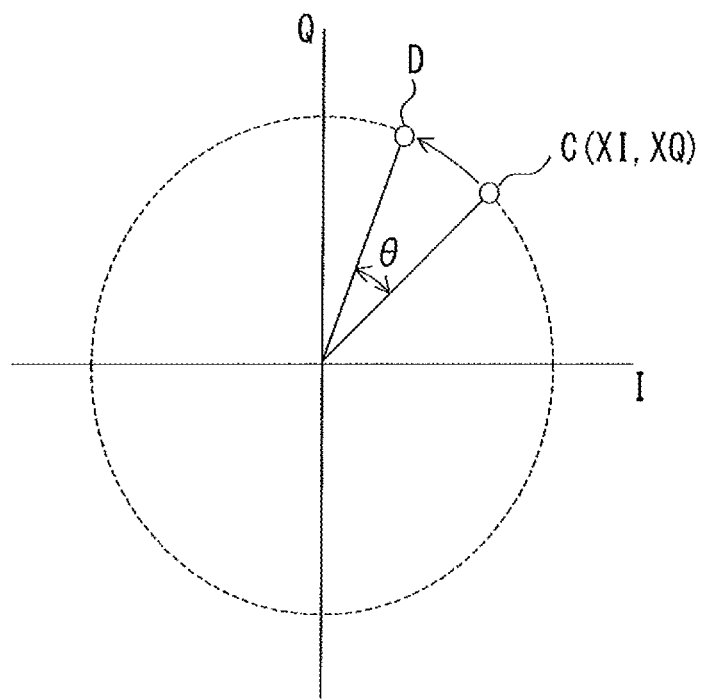
F I G. 8

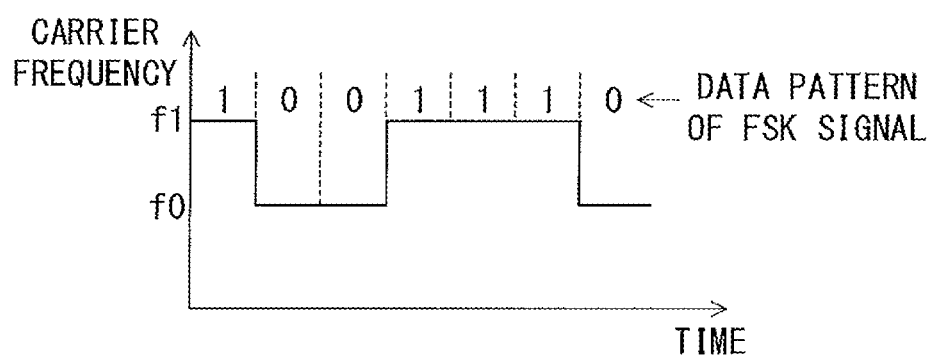
F I G. 9

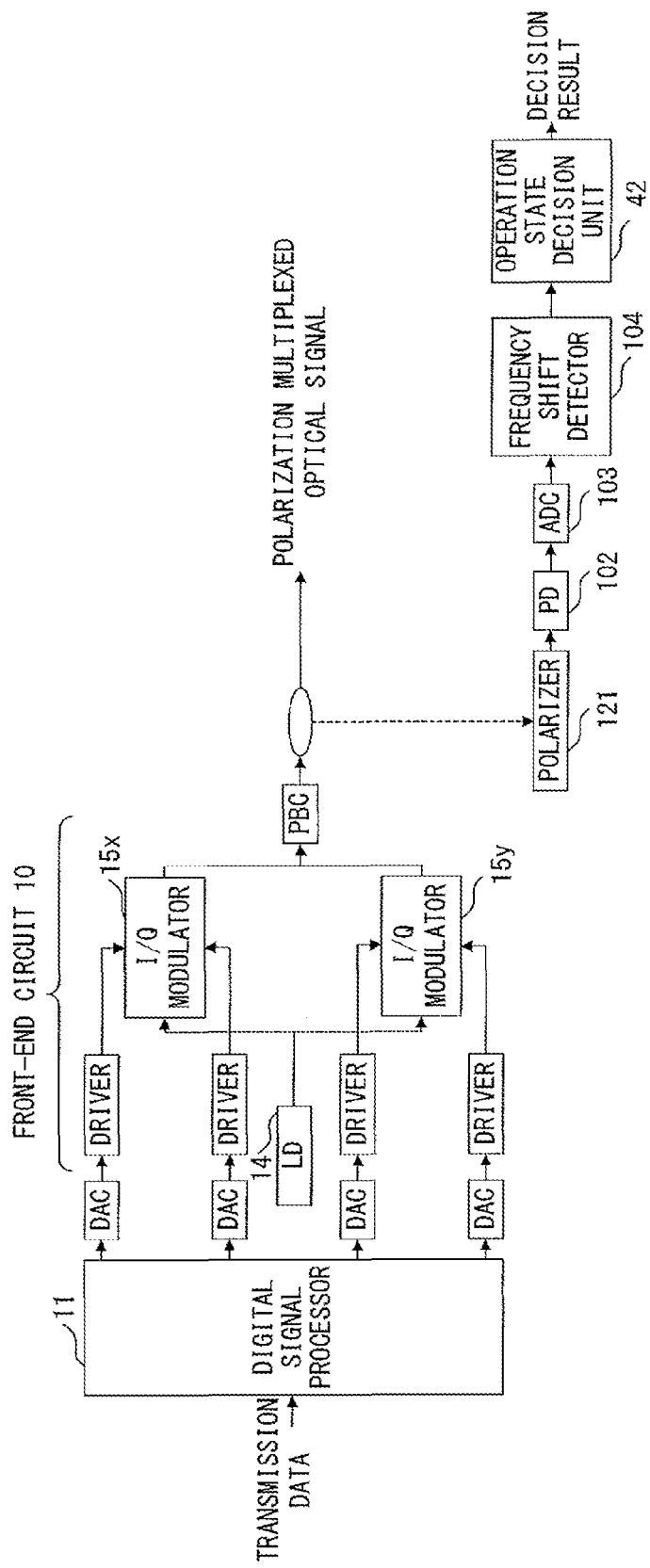
F I G. 22

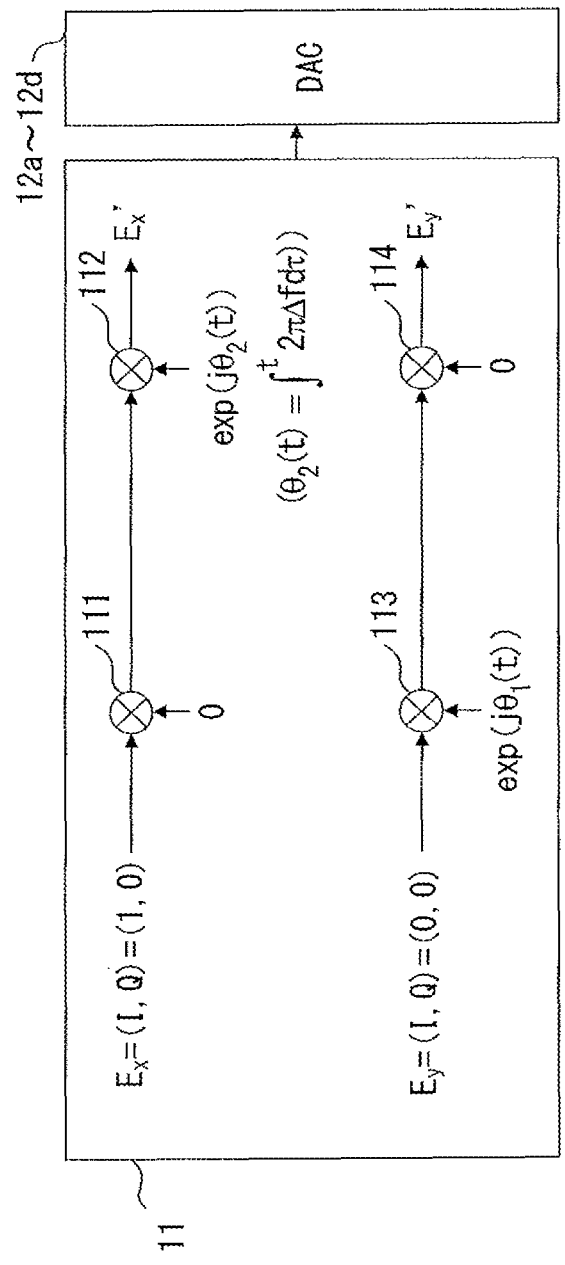
F I G. 23A
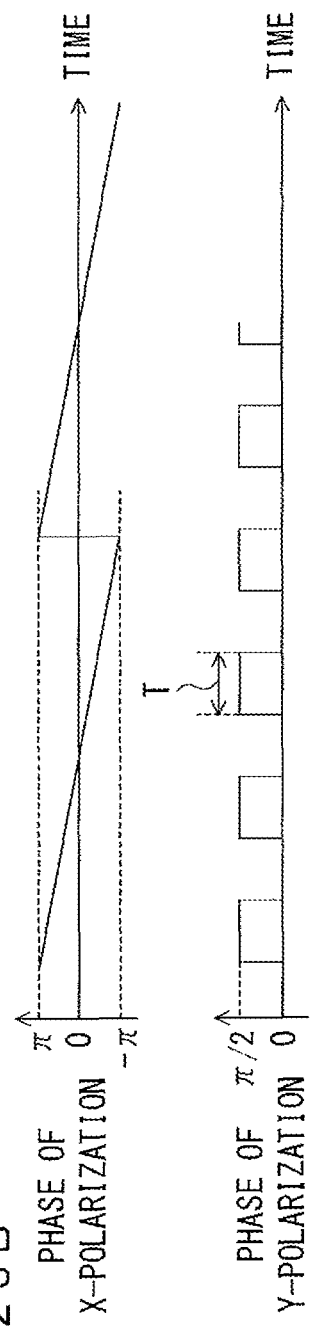
F I G. 23B

OPTICAL TRANSMITTER AND METHOD FOR CONTROLLING BIAS OF OPTICAL MODULATOR

CROSS-REFERENCE TO RELATED APPLICATION

This application is based upon and claims the benefit of priority of the prior Japanese Patent Application No. 2014-156114, filed on Jul. 31, 2014, the entire contents of which are incorporated herein by reference.

FIELD

The embodiments discussed herein are related to an optical transmitter and a method for controlling bias of an optical modulator.

BACKGROUND

In order to realize a high-speed and large-capacity optical transmission, a technology for transmitting a plurality of bits within one symbol time has been proposed. Multi-level modulation enables a plurality of bits to be transmitted with one symbol. As an example, QPSK (Quadrature Phase Shift Keying) and m-QAM (Quadrature Amplitude Modulation; m=16, 64, 256, or the like) have been put into practical use. In addition, polarization multiplexing enables signals to be transmitted by using two orthogonal polarization beams.

In recent years, multi-level modulation has been implemented by digital signal processing. As an example, a transmitter includes a digital signal processing circuit and an I/Q (in-phase/Quadrature) modulator. The digital signal processing circuit generates a driving signal from transmission data. The I/Q modulator modulates carrier light by using the driving signal given by the digital signal processing circuit, and generates a modulated optical signal. On the other hand, a receiver includes a front-end circuit and a digital signal processing circuit. The front-end circuit converts the received modulated optical signal into an electric field information signal. The digital signal processing circuit recovers the transmission data according to the electric field information signal.

The I/Q modulator is configured by using, for example, a Mach-Zehnder interferometer illustrated in FIG. 1. In the example illustrated in FIG. 1, an I/Q modulator 1000 includes an I-arm modulator 1001, a Q-arm modulator 1002, and a phase shifter 1003. To the I-arm modulator 1001, an I-arm driving signal and an I-arm bias voltage are given. To the Q-arm modulator 1002, a Q-arm driving signal and a Q-arm bias voltage are given. The I-arm driving signal and the Q-arm driving signal are generated by a digital signal processing circuit. The phase shifter 1003 generates a specified phase difference (for example, $\pi/2$) between the I-arm and the Q-arm.

To the I/Q modulator 1000, continuous wave light with a specified wavelength is input. The continuous wave light is split, and is guided to the I-arm modulator 1001 and the Q-arm modulator 1002. The I-arm modulator 1001 modulates the continuous wave light with the I-arm driving signal, and the Q-arm modulator 1002 modulates the continuous wave light with the Q-arm driving signal. The I/Q modulator 1000 combines an optical signal generated by the I-arm modulator 1001 and an optical signal generated by the Q-arm modulator 1002, and outputs a modulated optical signal.

An output optical power of each of the modulators (the I-arm modulator 1001 and the Q-arm modulator 1002) varies periodically with respect to an applied voltage, as illustrated in FIG. 2. In the description below, a point at which the output optical power of the modulator becomes a minimum may be referred to as a "null point (or minimum power transmission point)".

A driving signal (the I-arm driving signal or the Q-arm driving signal) is given to the modulator such that the center of the driving signal waveform matches the null point, as illustrated in FIG. 2. This operation state is realized by controlling a bias voltage (the I-arm bias voltage or the Q-arm bias voltage) applied to the modulator. In the description below, the center of the driving signal waveform may be referred to as an "operation point". A method for controlling biases of the respective arms of the I/Q modulator is described, for example, in Japanese Laid-open Patent Publication No. 2000-162563 (Japanese Patent No. 3723358). A method for controlling a bias of a $\pi/2$-phase shifter of the I/Q modulator is described, for example, in Japanese Laid-open Patent Publication No. 2007-082094 (Japanese Patent No. 4657860).

When a modulated optical signal is generated by using the I/Q modulator, bias control is performed such that an operation point of a driving signal matches a null point of the I/Q modulator, as described above. However, in the example illustrated in FIG. 2, different modulated optical signals are generated between a case at which the operation point is controlled so as to match a null point A and a case at which the operation point is controlled so as to match a null point B. As an example, in a case in which a BPSK signal is generated by using an NRZ driving signal, a phase of an output optical signal that corresponds to a driving signal is shifted by $\pi$ between a case at which the operation point is controlled so as to match the null point A and a case at which the operation point is controlled so as to match the minimum point B. Namely, a sign of an output optical signal electric field is inverted, and a logic of each of the bits is inverted in the binary phase modulation.

In recent years, a method to which pre-equalization processing in which a transmission signal is processed so as to improve a signal quality at a receiver by the digital signal processing is applied has been proposed. As an example, a light source frequency deviation of a transmitted optical signal or distortion due to a chromatic dispersion of optical transmission fiber can be compensated for by performing pre-equalization. In order to pre-equalize the light source frequency deviation or a chromatic dispersion in an optical transmission fiber, a phase of an optical signal is shifted. Such a process is realized by performing a specified process on the I-arm driving signal and the Q-arm driving signal in the digital signal processing circuit in the example illustrated in FIG. 1.

However, in a case in which an operation point of a modulator is not appropriately controlled, when a process of adding a phase rotation to an optical signal is assumed, a phase rotation in a reverse direction may be added due to the inappropriate operation point of the modulator. As an example, it is assumed that, when operation points of the I-arm modulator 1001 and the Q-arm modulator 1002 are set so as to match the same null point (for example, the null point A in FIG. 2), a phase of a modulated optical signal generated by the modulators is changed as illustrated in FIG. 3A. In this case, when the operation points of the I-arm modulator 1001 and the Q-arm modulator 1002 are set so as to match null points that are different from each other (for example, the null point A and the null point B), the phase of the modulated optical signal generated by the modulators is changed as illustrated in FIG. 3B. Namely, a phase rotation in a reverse direction is added. When a phase rotation in a direction reverse to the expected direction is added to an optical signal, a transmission quality of the optical signal may be deteriorate, compared with a case in which pre-equalization is not performed.

Further, in the polarization multiplexing transmission, when phase rotations of an X-polarization and a Y-polarization have directions reverse to each other, it may be difficult to split respective polarizations and to compensate for characteristics in a receiver.

This problem is not limited to a case in which the operation points of the I-arm and the Q-arm are not appropriately controlled. Namely, this problem may also arise when a phase of the phase shifter 1003 is controlled so as to be a value other than $\pi/2$ (for example, $3\pi/2$).

SUMMARY

According to an aspect of the embodiments, an optical transmitter includes: a mapper that generates an electric field information signal from transmission data; a phase rotation circuit that adds a phase rotation to the electric field information signal; a driver that generates a driving signal from the electric field information signal to which the phase rotation is added; a modulator that generates a modulated optical signal according to the driving signal; and a controller that controls a bias of the modulator according to a change in a carrier frequency of the modulated optical signal corresponding to the phase rotation that is added to the electric field information signal by the phase rotation circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of an optical transmitter.

FIGS. 7A and 7B illustrate examples of electric field information.

FIG. 8 is a diagram illustrating a phase rotation.

FIG. 9 illustrates a carrier frequency of an optical signal on which an FSK signal is superimposed.

FIG. 22 illustrates an example of a configuration of an optical transmitter according to a fifth embodiment.

FIGS. 23A and 23B are diagrams illustrating an operation according to the fifth embodiment.

DESCRIPTION OF EMBODIMENTS

Figure 1:
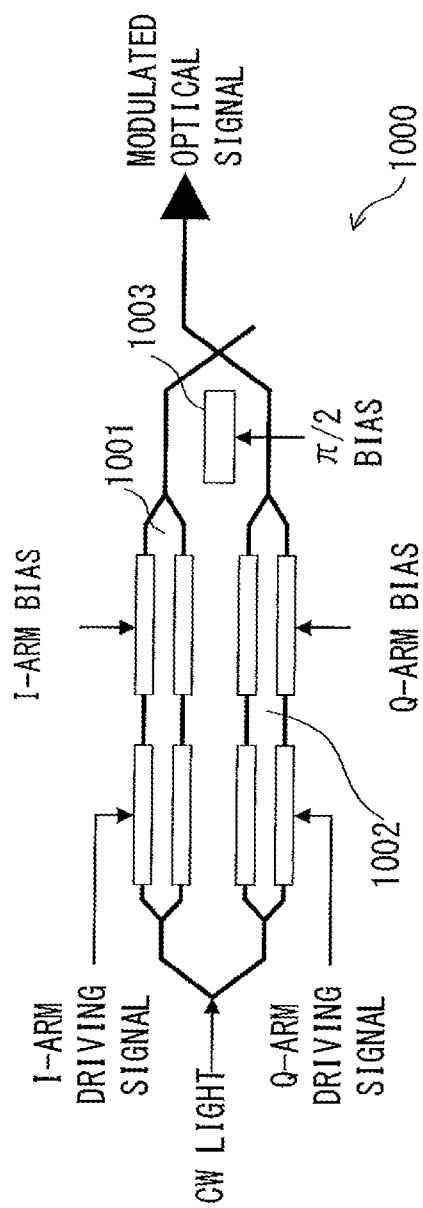
FIG. 1 illustrates a configuration of an I/Q modulator.

FIG. 4 illustrates an example of an optical transmitter. An optical transmitter 1 includes a digital signal processor 11, Digital-to-Analog (D/A) converters (DACs) 12a-12d, drivers 13a-13d, a light source 14, I/Q modulators 15x and 15y, and a Polarization Beam Combiner (PBC) 16. The drivers 13a-13d, the light source 14, the I/Q modulators 15x and 15y, and the polarization beam combiner 16 configure a transmitter front-end circuit 10.

The digital signal processor 11 generates an electric field information signal from transmission data by digital signal processing. In this example, the optical transmitter 1 transmits data by polarization multiplexing. Accordingly, the digital signal processor 11 generates an electric field information signal EX (XI, XQ) that corresponds to data transmitted by using an X-polarization and an electric field information signal EY (YI, YQ) that corresponds to data transmitted by using a Y-polarization.

The D/A converters 12a, 12b, 12c, and 12d respectively convert the electric field information signals XI, XQ, YI, and YQ that are generated by the digital signal processor 11 into analog signals. The drivers 13a, 13b, 13c, and 13d respectively generate driving signals XI, XQ, YI, and YQ from the electric field information signals XI, XQ, YI, and YQ that are output from the D/A converters 12a, 12b, 12c, and 12d. The light source 14 generates continuous wave light having a specified frequency.

The I/Q modulator 15x modulates the continuous wave light with the driving signals XI and XQ, and generates a modulated optical signal X. Similarly, the I/Q modulator 15y modulates the continuous wave light with the driving signals YI and YQ, and generates a modulated optical signal Y. The I/Q modulators 15x and 15y are Mach-Zehnder modulators illustrated in FIG. 1 in this example. Therefore, in the I/Q modulator 15x, the driving signal XI is given to the I-arm modulator 1001 as an I-arm driving signal, and the driving signal XQ is given to the Q-arm modulator 1002 as a Q-arm driving signal. Similarly, in the I/Q modulator 15y, the driving signal YI is given to the I-arm modulator 1001 as an I-arm driving signal, and the driving signal YQ is given to the Q-arm modulator 1002 as a Q-arm driving signal.

The polarization beam combiner 16 combines the modulated optical signal X generated by the I/Q modulator 15x and the modulated optical signal Y generated by the I/Q modulator 15y to generate a polarization multiplexed optical signal. The polarization multiplexed optical signal is transmitted to an optical receiver via an optical transmission line 17. The optical transmission line 17 may be provided with one or a plurality of optical amplifiers.

Figure 5:
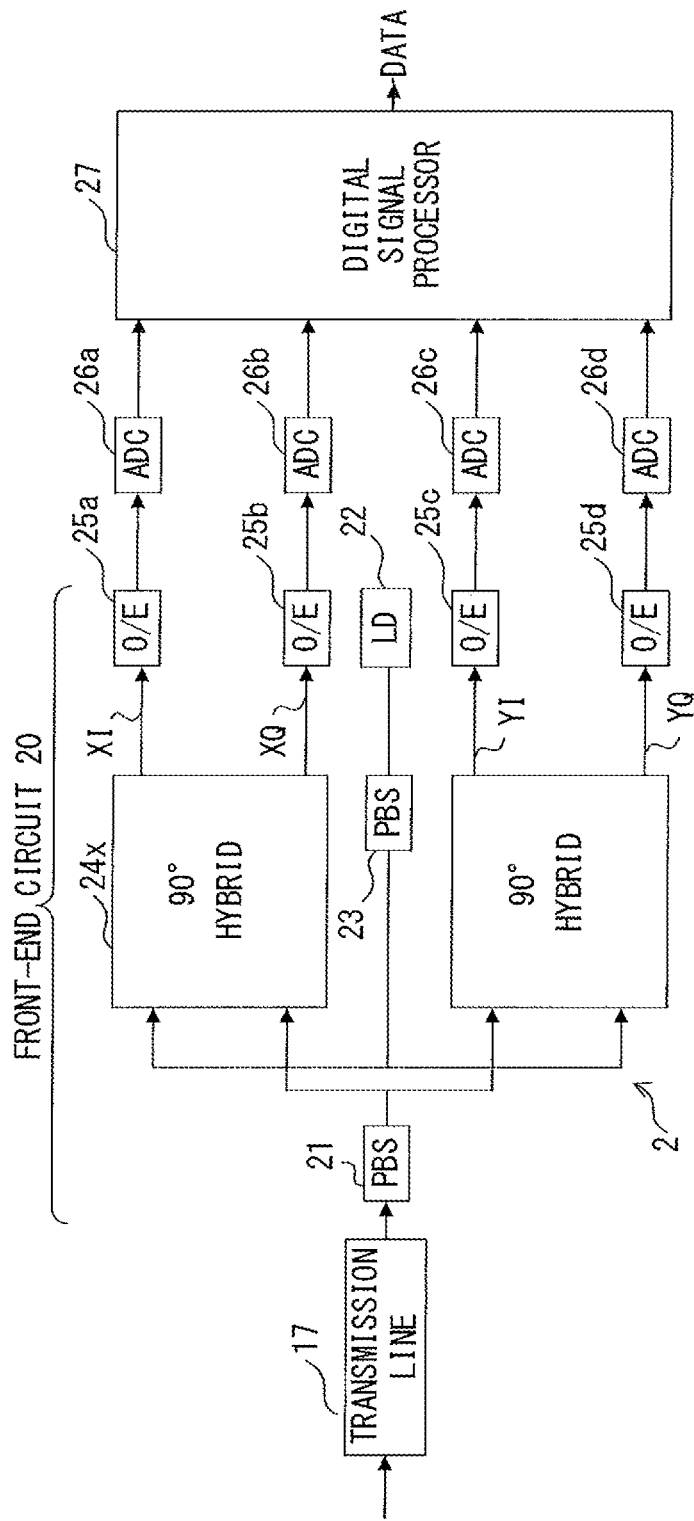
FIG. 5 illustrates an example of an optical receiver.

FIG. 5 illustrates an example of an optical receiver. An optical receiver 2 includes a Polarization Beam Splitter (PBS) 21, a local oscillation light source 22, a polarization beam splitter 23, 90-degree optical hybrid circuits 24x and 24y, Optical-to-Electrical (O/E) converters 25a-25d, Analog-to-Digital (A/D) Converters (ADCs) 26a-26d, and a digital signal processor 27. The polarization beam splitter 21, the local oscillation light source 22, the polarization beam splitter 23, the 90-degree optical hybrid circuits 24x and 24y, and the O/E converters 25a-25d configure a receiver front-end circuit 20. The optical receiver 2 receives the polarization multiplexed optical signal transmitted from the optical transmitter 1 illustrated in FIG. 4.

The polarization beam splitter 21 splits the received polarization multiplexed optical signal into optical signals X and Y that are orthogonal to each other, and guides the optical signals X and Y to the 90-degree optical hybrid circuits 24x and 24y. The local oscillation light source 22 generates local oscillation light having a specified frequency. The local oscillation light is continuous wave light in this example. A frequency of the light source 14 (i.e., a carrier frequency) is almost the same as a frequency of the local oscillation light source 22. The polarization beam splitter 23 splits the local oscillation light generated by the local oscillation light source 22 into local oscillation light X and Y that are orthogonal to each other, and guides the local oscillation light X and Y to the 90-degree optical hybrid circuits 24x and 24y.

The 90-degree optical hybrid circuit 24x obtains an I component and a Q component (XI and XQ) of the optical signal X by using the local oscillation light X. Similarly, the 90-degree optical hybrid circuit 24y obtains an I component and a Q component (YI and YQ) of the optical signal Y by using the local oscillation light Y. The O/E converters 25a, 25b, 25c, and 25d respectively convert the optical signal components XI, XQ, YI, and YQ into electrical signals. The A/D converters 26a, 26b, 26c, and 26d respectively convert the electrical signals XI, XQ, YI, and YQ into digital signals. The digital signals XI, XQ, YI, and YQ indicate electric field information of the received polarization multiplexed optical signal. Namely, the receiver front-end circuit 20 generates electrical field information of the received polarization multiplexed optical signal by coherent detection. The digital signal processor 27 recovers data in accordance with the electric field information of the received polarization multiplexed optical signal (i.e., the digital signals XI, XQ, YI, and YQ).

Figure 6:
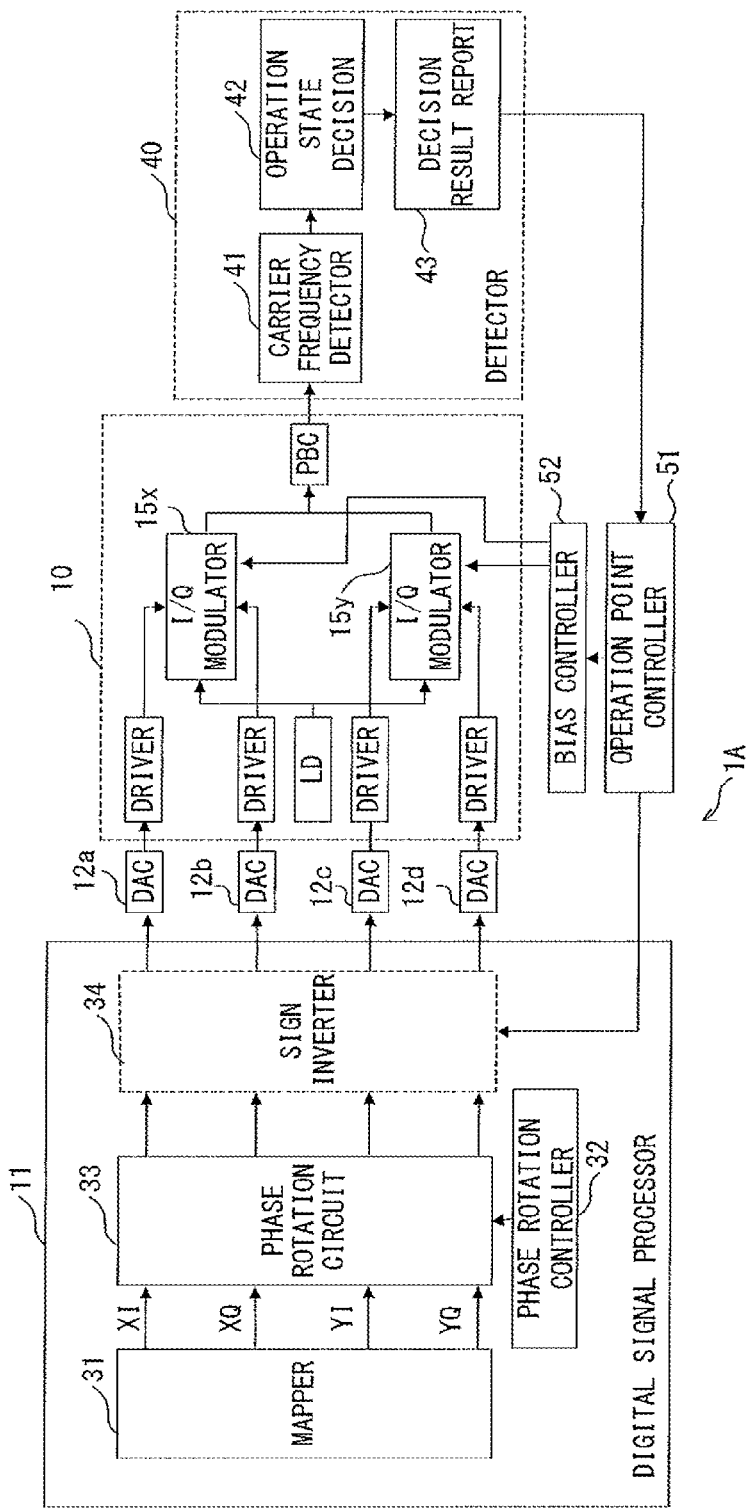
FIG. 6 illustrates an example of a configuration of an optical transmitter according to embodiments.

FIG. 6 illustrates an example of a configuration of an optical transmitter according to embodiments. An optical transmitter 1A according to the embodiments includes a transmitter front-end circuit 10, a digital signal processor 11, D/A converters 12a-12d, a detector 40, an operation point controller 51, and a bias controller 52, as illustrated in FIG. 6. The transmitter front-end circuit 10 in FIG. 6 is substantially the same as that in FIG. 4, and therefore the description thereof is omitted.

The optical transmitter 1A includes I/Q modulators 15x and 15y. Each of the I/Q modulators 15x and 15y includes the I-arm modulator 1001, the Q-arm modulator 1002, and the phase shifter 1003, as illustrated in FIG. 1. An output optical power of each of the arms of the I/Q modulators 15x and 15y varies periodically with respect to an applied voltage.

In the optical transmitter 1A, an operation point of each of the arms of the I/Q modulators 15x and 15y is controlled so as to match one of the null points. Here, the operation point of each of the arms of the I/Q modulators 15x and 15y is controlled by a bias voltage (an I-arm bias or a Q-arm bias). Namely, in the optical transmitter 1A, the bias voltage is controlled such that the center of a driving signal waveform is located at one of the null points.

However, for the I/Q modulators 15x and 15y, operation states of the I/Q modulators are different between a case when an operation point of the I-arm modulator 1001 and an operation point of the Q-arm modulator 1002 are controlled so as to match the same null point and a case when the operation point of the I-arm modulator 1001 and the operation point of the Q-arm modulator 1002 are controlled so as to match different null points. As an example, it is assumed that a phase rotation R is added to an electric field information signal for driving the I/Q modulator. It is also assumed that a carrier frequency of output light of the I/Q modulator increases by $\Delta f$ due to the phase rotation R when the operation point of the I-arm modulator 1001 and the operation point of the Q-arm modulator 1002 are controlled so as to match the same null point. In this case, when the operation point of the I-arm modulator 1001 and the operation point of the Q-arm modulator 1002 are controlled so as to match different null points, the carrier frequency of the output light of the I/Q modulator decreases by $\Delta f$ due to the phase rotation R. Namely, a relationship between a direction of the phase rotation of the electric field information signal and a direction of a change in the carrier frequency of the output light of the I/Q modulator is different between a case when the operation point of the I-arm modulator 1001 and the operation point of the Q-arm modulator 1002 are controlled so as to match the same minimum point and a case when the operation point of the I-arm modulator 1001 and the operation point of the Q-arm modulator 1002 are controlled so as to match different null points. Note that when a phase rotation is added to the electric field information signal for driving the I/Q modulator, the carrier frequency of the output light of the I/Q modulator is changed corresponding to the phase rotation.

In the description below, a state in which the operation point of the I-arm modulator 1001 and the operation point of the Q-arm modulator 1002 are controlled so as to match the same null point may be referred to as an "in-phase state". In addition, a state in which the operation point of the I-arm modulator 1001 and the operation point of the Q-arm modulator 1002 are controlled so as to match different minimum points may be referred to as an "inverted state".

In the optical transmitter 1A according to the embodiments, the operation states of the I/Q modulators 15x and 15y are controlled so as to be the same. Namely, both of the I/Q modulators 15x and 15y are controlled so as to operate in the in-phase state. Alternatively, both of the I/Q modulators 15x and 15y are controlled so as to operate in the inverted state.

In addition, in the optical transmitter 1A according to the embodiments, the I/Q modulators 15x and 15y are controlled so as to operate in respective expected operation states. The "expected operation state" refers to a state in which, when a phase rotation is added to an electric field information signal, a carrier frequency is shifted in an expected direction with respect to a direction of the phase rotation. An example of the "expected operation state" is a state in which, when a phase rotation for advancing a phase of an electric field information signal is added, a carrier frequency increases in accordance with a speed of the phase rotation, and in which, when a phase rotation for delaying the phase of the electric field information signal is added, the carrier frequency decreases in accordance with the speed of the phase rotation. Alternatively, the "expected operation state" may be a state in which, when a phase rotation for advancing the phase of the electric field information signal is added, the carrier frequency decreases in accordance with the speed of the phase rotation, and in which, when a phase rotation for delaying the phase of the electric field information signal is added, the carrier frequency increases in accordance with the rotation phase. The "expected operation state" is not particularly limited but is realized, for example, by setting the I/Q modulators to be in the in-phase state. When the digital signal processor 11 generates an electric field information signal assuming that the I/Q modulators operate in the in-phase state, the I/Q modulators are controlled so as to operate in the in-phase state. A configuration and an operation of the optical transmitter 1A are described below.

The digital signal processor 11 includes a mapper 31, a phase rotation controller 32, and a phase rotation circuit 33. The mapper 31 generates an electric field information signal from transmission data. The electric field information indicates an amplitude and a phase of a modulated optical signal generated in the transmitter front-end circuit 10. Namely, the mapper 31 generates an electric field information signal EX (XI, XQ) that corresponds to data transmitted by using an X-polarization, and an electric field information signal EY (YI, YQ) that corresponds to data transmitted by using a Y-polarization. The electric field information signals can be expressed by the following complex numbers.

$$EX=XI+jXQ$$

$$EY=YI+jYQ$$

As an example, when a modulation format is QPSK, the mapper 31 maps transmission data on a constellation illustrated in FIG. 7A. When a modulation format is 16QAM, the mapper 31 maps the transmission data on a constellation illustrated in FIG. 7B.

The phase rotation controller 32 generates a phase rotation control signal indicating a phase rotation θ(t), and gives the phase rotation control signal to the phase rotation circuit 33. The phase rotation controller 32 can give a phase rotation control signal to each of the electric field information signals EX and EY. The phase rotation circuit 33 adds a phase rotation to each of the electric field information signals EX and EY in accordance with the phase rotation control signals. A process of the phase rotation circuit 33 is expressed by the following expressions (1) and (2).

$$EX_{out}=EX_{in}*\exp(j\theta(t)) \quad (1)$$

$$EY_{out}=EY_{in}*\exp(j\theta(t)) \quad (2)$$

The phase rotations may also be expressed by the following expressions (3) and (4).

$$XI_{out}=XI_{in}*\cos\theta(t)-XQ_{in}*\sin\theta(t)$$

$$XQ_{out}=XI_{in}*\sin\theta(t)+XQ_{in}*\cos\theta(t) \quad (3)$$

$$YI_{out}=YI_{in}*\cos\theta(t)-YQ_{in}*\sin\theta(t)$$

$$YQ_{out}=YI_{in}*\sin\theta(t)+YQ_{in}*\cos\theta(t) \quad (4)$$

As an example, it is assumed that a modulation format is QPSK, and that transmission data is mapped at a constellation point C illustrated in FIG. 8. The phase rotation controller 32 generates a phase rotation control signal indicating a phase rotation θ. In this case, the phase rotation circuit 33 rotates a phase of an electric field information signal by θ. As a result, an electric field information signal indicating a constellation point D is output from the phase rotation circuit 33.

The transmitter front-end circuit 10 generates a polarization multiplexed optical signal in accordance with the electric field information signals XI, XQ, YI, and YQ that are generated by the digital signal processor 11. Specifically, driving signals XI, XQ, YI, and YQ are generated from the electric field information signals XI, XQ, YI, and YQ, respectively. Then, the I/Q modulator 15x modulates continuous wave light with the driving signal X (XI, XQ) to generate a modulated optical signal X. The I/Q modulator 15y modulates continuous wave light with the driving signal Y (YI, YQ) to generate a modulated optical signal Y. The polarization beam combiner 16 combines the modulated optical signal X generated by the I/Q modulator 15x and the modulated optical signal Y generated by the I/Q modulator 15y to generate a polarization multiplexed optical signal.

The detector 40 includes a carrier frequency detector 41, an operation state decision unit 42, and a decision result report unit 43. The detector 40 detects operation states of the I/Q modulators 15x and 15y in accordance with the polarization multiplexed optical signal transmitted from the transmitter front-end circuit 10.

The carrier frequency detector 41 detects carrier frequencies of the modulated optical signals X and Y multiplexed into the polarization multiplexed optical signal. Here, the carrier frequency detector 41 may detect changes in the carrier frequencies of the modulated optical signals X and Y. The operation state decision unit 42 decides operation states of the I/Q modulators 15x and 15y in accordance with the carrier frequencies detected by the carrier frequency detector 41. Namely, the operation state decision unit 42 decides whether the operation states of the I/Q modulators 15x and 15y are in the "in-phase state" or in the "inverted state". Alternatively, the operation state decision unit 42 decides whether the operation states of the I/Q modulators 15x and 15y are the same as each other. The decision result report unit 43 reports a decision result by the operation state decision unit 42 to the operation point controller 51.

The detector 40 is included, for example, in the optical transmitter 1A. In this case, the polarization multiplexed optical signal transmitted from the transmitter front-end circuit 10 is split by an optical splitter (not illustrated), and is guided to the detector 40. It is preferable that the optical transmitter 1A be configured such that polarizations are maintained between the transmitter front-end circuit 10 and the detector 40.

The detector 40 may be provided outside the optical transmitter 1A. As an example, the detector 40 may be provided in an optical receiver or an optical transmission device that receives a polarization multiplexed optical signal transmitted from the optical transmitter 1A. In this case, the detector 40 may transmit a decision result to the optical transmitter 1A by using a supervisory channel or a unused region of an OTU frame. Alternatively, the detector 40 may superimpose a signal indicating a decision result on an optical signal that is transmitted from the optical receiver or the optical transmission device to the optical transmitter 1A.

Further, a decision result may be reported from the detector 40 via a network management system to the optical transmitter 1A.

The operation point controller 51 generates a control signal for controlling the operation states of the I/Q modulators 15x and 15y in accordance with a report from the detector 40. Specifically, the operation point controller 51 may perform the following control.

(1) When the operation state of the I/Q modulator 15x is different from an expected operation state, the operation point controller 51 changes the operation state of the I/Q modulator 15x. As an example, when the digital signal processor 11 generates an electric field information signal under the assumption that the I/Q modulator 15x is in the in-phase state, and when the I/Q modulator 15x is set to be in the inverted state, the operation point controller 51 changes the operation state of the I/Q modulator 15x from the inverted state to the in-phase state.

(2) When the operation state of the I/Q modulator 15y is different from an expected operation state, the operation point controller 51 changes the operation state of the I/Q modulator 15y. As an example, when the digital signal processor 11 generates an electric field information signal assuming that the I/Q modulator 15y is in the in-phase state, and when the I/Q modulator 15y is set to be in the inverted state, the operation point controller 51 changes the operation state of the I/Q modulator 15y from the inverted state to the in-phase state.

(3) When the operation states of the I/Q modulators 15x and 15y are different from each other, the operation point controller 51 changes the operation state of one of the I/Q modulators 15x and 15y such that the operation states of the I/Q modulators 15x and 15y become the same as each other.

The operation states of the I/Q modulators 15x and 15y may be changed with one of the methods below. A case in which the operation state of the I/Q modulator 15x is changed is described below, but a method for changing the operation state of the I/Q modulator 15y is substantially the same as a method for changing the operation state of the I/Q modulator 15x.

Figure 2:
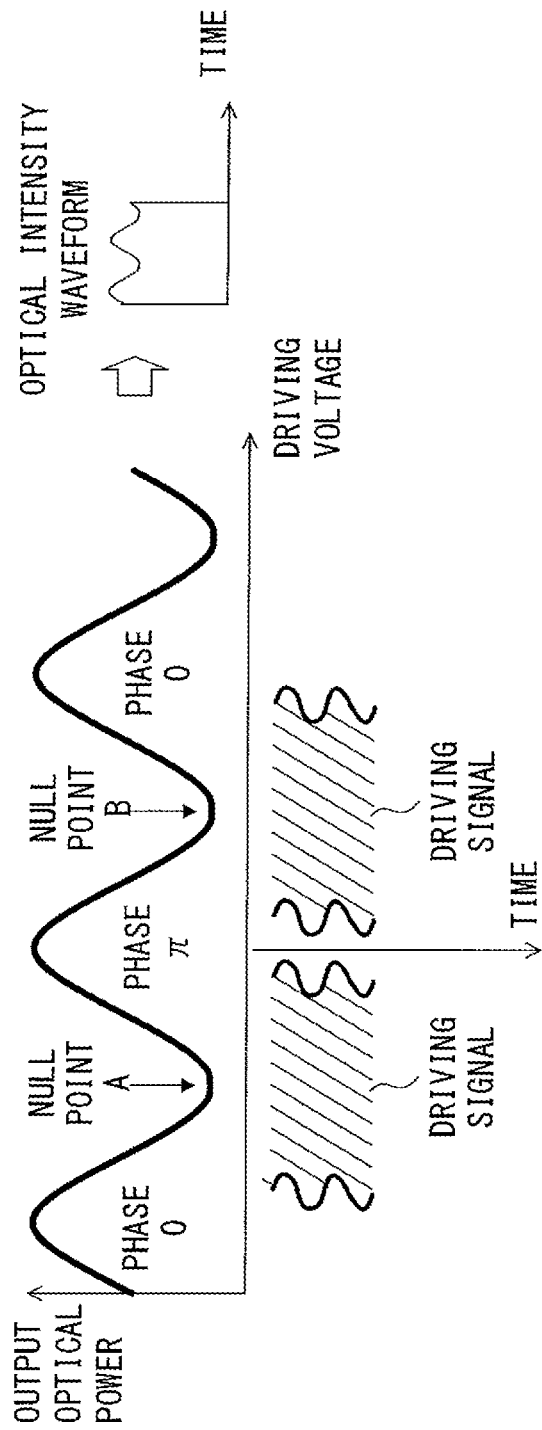
FIG. 2 illustrates a characteristic of an I/Q modulator.
Figure 3:
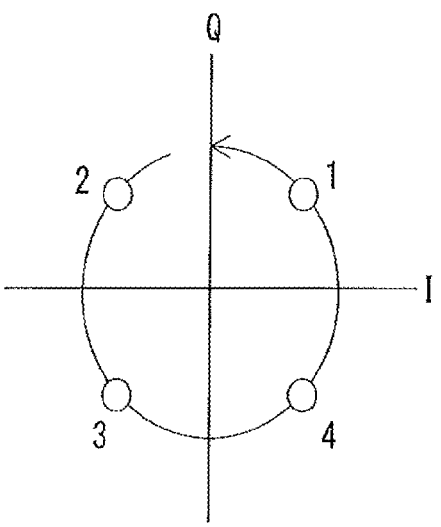
FIGS. 3A and 3B are diagrams illustrating an operation state and a phase rotation of a modulator.

Method 1: The operation point controller 51 shifts an operation point of the I-arm modulator 1001 or the Q-arm modulator 1002 of the I/Q modulator 15x to a next null point. As an example, in FIG. 2, it is assumed that the operation point of the I-arm modulator 1001 is located at the null point A, and that the operation point of the Q-arm modulator 1002 is located at the null point B. Namely, it is assumed that the operation state of the I/Q modulator 15x is in the inverted state. In this case, if the operation point of the I-arm modulator 1001 is shifted from the null point A to the null point B, the operation state of the I/Q modulator 15x transits from the inverted state to the in-phase state. Similarly, if the operation point of the Q-arm modulator 1002 is shifted from the null point B to the null point A, the operation state of the I/Q modulator 15x transits from the inverted state to the in-phase state.

Method 2: The operation point controller 51 changes a phase difference between the I-arm modulator 1001 and the Q-arm modulator 1002 of the I/Q modulator 15x by $\pi$. As an example, when the phase difference between the I-arm modulator 1001 and the Q-arm modulator 1002 is controlled to be $\pi/2$, the phase difference is shifted from $\pi/2$ to $3\pi/2$. Alternatively, when the phase difference between the I-arm modulator 1001 and the Q-arm modulator 1002 is controlled to be $3\pi/2$, the phase difference is shifted from $3\pi/2$ to $\pi/2$. In the I/Q modulator 15x, when the phase difference between the I-arm modulator 1001 and the Q-arm modulator 1002 is changed by $\pi$, substantially the same optical effect can be obtained as the optical effect that is obtained when the operation point of the I-arm modulator 1001 or the Q-arm modulator 1002 is shifted to the next minimum point. Here, it is noted that "$\pi/2$" includes $\pi/2+2n\pi$ (n: an integer) and that "$3\pi/2$" includes $3\pi/2+2n\pi$ (n: an integer).

Method 3: The operation point controller 51 inverts a sign of the I component or the Q component of the electric field information signal EX for driving the I/Q modulator 15x. As an example, when the electric field information signal EX (XI, XQ) is generated, the electric field information signal is converted into (XI, −XQ). Alternatively, the electric field information signal may be converted into (−XI, XQ). In the I/Q modulator 15x, when a sign of the I component or the Q component of the electric field information signal EX for driving the I/Q modulator 15x is inverted, substantially the same effect can be obtained as the effect obtained when the operation point of the I-arm modulator 1001 or the Q-arm modulator 1002 is shifted to the next null point.

When changing the operation state of the I/Q modulator 15x with method 1, the operation point controller 51 issues a change instruction to the bias controller 52. Upon receiving the change instruction, the bias controller 52 controls a bias voltage of the I-arm modulator 1001 or the Q-arm modulator 1002 of the I/Q modulator 15x. As an example, the bias controller 52 shifts the operation point of the I-arm modulator 1001 to the next null point by controlling the bias voltage of the I-arm modulator 1001.

Also, when changing the operation state of the I/Q modulator 15x with method 2, the operation point controller 51 issues a change instruction to the bias controller 52. In this case, however, the bias controller 52 controls a bias voltage of the phase shifter 1003 of the I/Q modulator 15x according to the change instruction. Namely, the bias controller 52 controls the bias voltage of the phase shifter 1003 such that the phase difference between the I-arm modulator 1001 and the Q-arm modulator 1002 is changed by $\pi$.

When changing the operation state of the I/Q modulator 15x with method 3, the operation point controller 51 issues a change instruction to a sign inverter 34 provided in the digital signal processor 11. Upon receiving the change instruction, the sign inverter 34 inverts a sign of the I component or the Q component of the electric field information signal of the I/Q modulator 15x. As an example, the sign inverter 34 converts the electric field information signal (XI, XQ) into (XI, −XQ). The sign inverter 34 may be provided on an input side of the phase rotation circuit 33 or on an output side of the phase rotation circuit 33. When the operation state of the I/Q modulator is controlled with method 1 or method 2 described above, the digital signal processor 11 does not need to include the sign inverter 34.

As described above, when the I/Q modulators 15x and 15y are not controlled so as to be in an expected operation state, the optical transmitter 1A according to the embodiments can change the operation states of the I/Q modulators 15x and 15y. Accordingly, the optical transmitter 1A can perform a desired pre-equalization on a modulated optical signal generated by each of the I/Q modulators 15x and 15y. When the operation states of the I/Q modulators 15x and 15y are different from each other, the optical transmitter 1A according to the embodiments can control the operation states of the I/Q modulators 15x and 15y to be the same as each other. Therefore, when a polarization multiplexed optical signal is generated by the optical transmitter 1A, the optical receiver can precisely split the polarization multiplexed optical signal into respective polarization, and can precisely compensate for characteristics of respective optical signals.

First Embodiment

In a first embodiment, the phase rotation controller 32 and the phase rotation circuit 33 superimpose a Frequency Shift Keying (FSK) signal on an electric field information signal. The FSK signal indicates a specified data pattern. Respective bits of the data pattern indicate "1" or "0".

In this case, the phase rotation θ(t) is expressed by the following expression (5).

$$\theta(t)=\int^t 2\pi(mf(\tau))d\tau \quad (5)$$

f(t) is a data pattern of the FSK signal, and expresses "1" or "0", as described above. m expresses a modulation shift. A bit rate of the FSK signal is not particularly limited, but is at a sufficiently low speed, compared with, for example, a baud rate of the polarization multiplexed optical signal transmitted from the optical transmitter 1A.

The phase rotation circuit 33 adds the phase rotation θ(t) to the electric field information signal. As an example, when adding the phase rotation θ(t) to the electric field information signal EX (XI, XQ) for driving the I/Q modulator 15x, the phase rotation circuit 33 puts the phase rotation θ(t) expressed by expression (5) into the above expression (1) or (3). Similarly, when adding the phase rotation θ(t) to the electric field information signal EY (YI, YQ) for driving the I/Q modulator 15y, the phase rotation circuit 33 puts the phase rotation θ(t) expressed by expression (5) into the above expression (2) or (4). The transmitter front-end circuit 10 generates a modulated optical signal in accordance with the electric field information signal to which the phase rotation has been added in this manner.

FIG. 9 illustrates a carrier frequency of an optical signal on which an FSK signal is superimposed. In this example, when an FSK signal is "1", a carrier frequency of an optical signal is f1, and when an FSK signal is "0", a carrier frequency of an optical signal is f0.

When the phase rotation θ(t) is added to the electric field information signal EX (XI, XQ), a carrier frequency of the modulated optical signal X output from the I/Q modulator 15x varies as described in FIG. 9. Namely, the FSK signal is superimposed on the modulated optical signal that is transmitted by using the X-polarization. Similarly, when the phase rotation θ(t) is added to the electric field information signal EY (YI, YQ), a carrier frequency of the modulated optical signal Y output from the I/Q modulator 15y varies as described in FIG. 9. Namely, the FSK signal is superimposed on the modulated optical signal that is transmitted by using the Y-polarization. The modulation shift m described above corresponds to a difference between the frequency f0 and the frequency f1.

Figure 10:
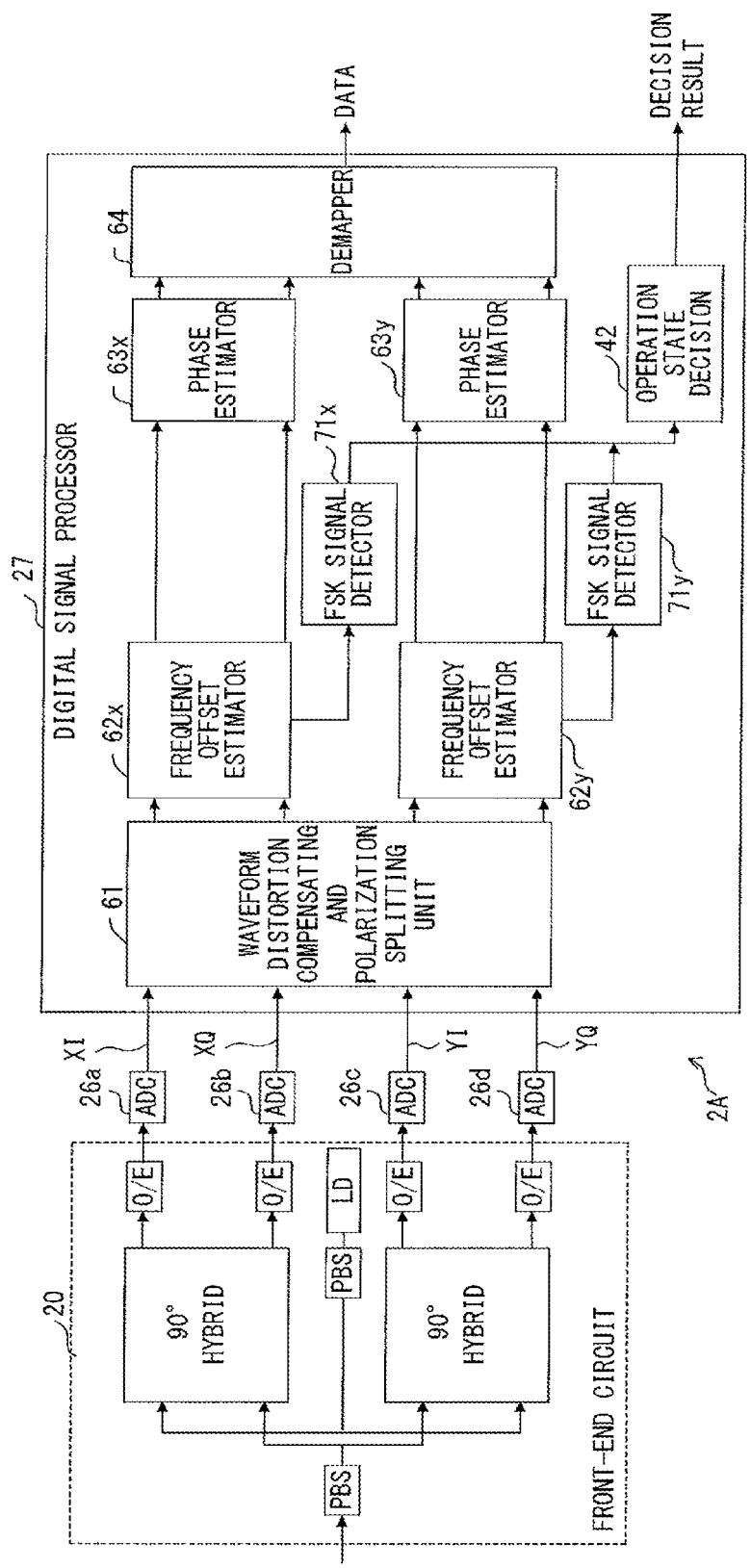
FIG. 10 illustrates an example of a configuration that realizes a detector according to a first embodiment.

FIG. 10 illustrates an example of a configuration that realizes a detector according to the first embodiment. In the example illustrated in FIG. 10, a detector is provided in an optical receiver 2A that receives the polarization multiplexed optical signal generated by the optical transmitter 1A.

The optical receiver 2A includes a receiver front-end circuit 20, A/D converters 26a-26d, and a digital signal processor 27. The receiver front-end circuit 20 generates electric field information XI, XQ, YI, and YQ that indicate the received polarization multiplexed optical signal, as described with reference to FIG. 5.

The digital signal processor 27 includes a waveform distortion compensating and polarization splitting unit 61, frequency offset estimators 62x and 62y, phase estimators 63x and 63y, a demapper 64, FSK signal detectors 71x and 71y, and an operation state decision unit 42. The electric field information XI, XQ, YI, and YQ that indicate the received polarization multiplexed optical signal are given to the digital signal processor 27.

The waveform distortion compensating and polarization splitting unit 61 performs compensation for waveform distortion due to transmission and splitting of polarization on the electric field information XI, XQ, YI, and YQ. As a result, the electric field information XI and XQ only include the modulated optical signal X that is generated by the I/Q modulator 15x, and that is transmitted by using the X-polarization. Similarly, the electric field information YI and YQ only include the modulated optical signal Y that is generated by the I/Q modulator 15y, and that is transmitted by using the Y-polarization. The waveform distortion compensating and polarization splitting unit 61 compensates for a waveform distortion of the signal X that is indicated by the electric field information XI and XQ, and compensates for a waveform distortion of the signal Y that is indicated by the electric field information YI and YQ. The waveform distortion compensating and polarization splitting unit 61 may be implemented, for example, by an FIR filter.

The frequency offset estimator 62x estimates and compensates for a frequency offset of the modulated optical signal X in accordance with the electric field information XI and XQ for which a waveform distortion has been compensated. The frequency offset indicates a difference between the carrier frequency of the modulated optical signal X and a frequency of the local oscillation light source 22 of the receiver front-end circuit 20. The frequency offset estimator 62x outputs the electric field information XI and XQ for which the frequency offset has been compensated. The frequency offset of the modulated optical signal X that has been estimated by the frequency offset estimator 62x is given to the FSK signal detector 71x.

Similarly, the frequency offset estimator 62y estimates and compensates for a frequency offset of the modulated optical signal Y in accordance with the electric field information YI and YQ for which a waveform distortion has been compensated. The frequency offset indicates a difference between the carrier frequency of the modulated optical signal Y and the frequency of the local oscillation light source 22 of the receiver front-end circuit 20. The frequency offset estimator 62y outputs the electric field information YI and YQ for which the frequency offset has been compensated. The frequency offset of the modulated optical signal Y that has been estimated by the frequency offset estimator 62y is given to the FSK signal detector 71y.

When the received optical signal is an mPSK signal, the frequency offset may be estimated by m-th power method, for example. Alternatively, the frequency offset may be estimated with the temporary decision method. In any case, a method for estimating and compensating for a frequency offset is a publicly known technology, and therefore the detailed description thereof is omitted.

The phase estimator 63x estimates a phase error between the transmitter light source and the local oscillation light source in accordance with the electric field information XI and XQ for which the frequency offset has been compensated. The phase estimator 63x then outputs the electric field information XI and XQ for which the phase error has been compensated. Similarly, the phase estimator 63y outputs the electric field information YI and YQ for which a phase error has been compensated. A method for estimating and compensating for a phase error is also a publicly known technology, and therefore the detailed description thereof is omitted. The demapper 64 recovers transmission data in accordance with the electric field information XI, XQ, YI, and YQ for which the frequency offset and the phase error have been compensated.

The FSK signal detector 71x detects an FSK signal superimposed on the modulated optical signal X in accordance with the frequency offset of the modulated optical signal estimated by the frequency offset estimator 62x. In the case illustrated in FIG. 11A, "1001110" is detected as the FSK signal superimposed on the modulated optical signal X. In the case illustrated in FIG. 11B, "0110001" is detected as the FSK signal superimposed on the modulated optical signal X. Similarly, the FSK signal detector 71y detects an FSK signal superimposed on the modulated optical signal Y in accordance with the frequency offset of the modulated optical signal Y estimated by the frequency offset estimator 62y. Note that the FSK signal detectors 71x and 71y are examples of the carrier frequency detector 41 illustrated in FIG. 6. The operation state decision unit 42 decides the operation states of the I/Q modulators 15x and 15y of the optical transmitter 1A in accordance with data patterns of the FSK signals respectively detected by the FSK signal detectors 71x and 71y.

Figure 12:
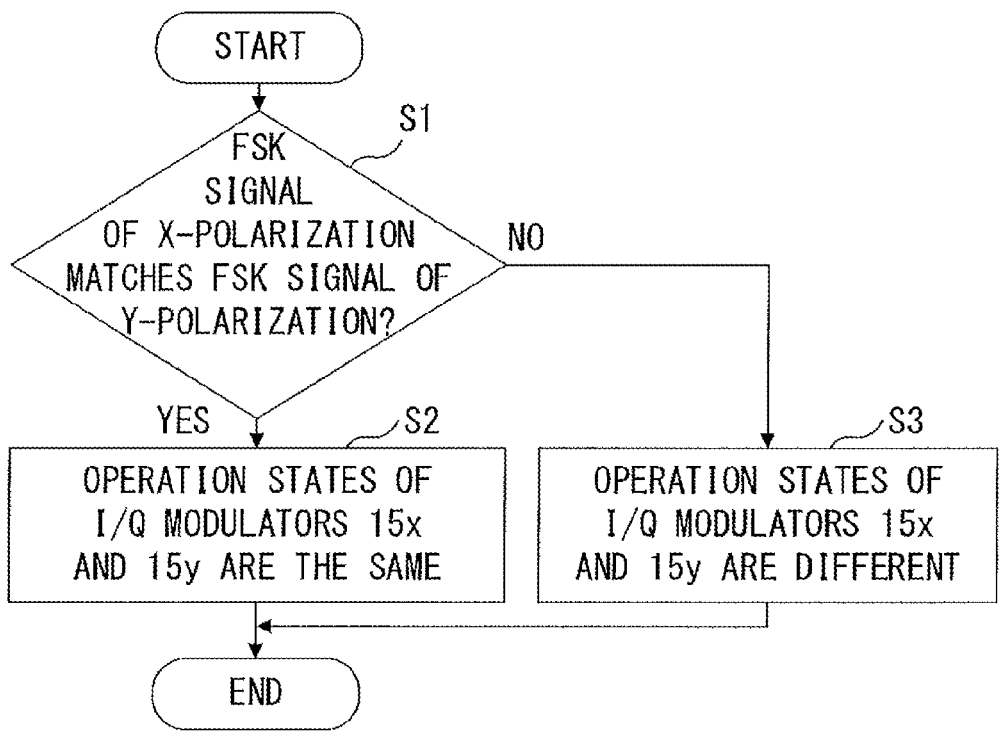
FIG. 12 is a flowchart illustrating an example of a process of deciding an operation state by using an FSK signal.

FIG. 12 is a flowchart illustrating an example of a process of deciding an operation state by using an FSK signal. In this example, in S1, the operation state decision unit 42 compares the data pattern of the FSK signal detected by the FSK signal detector 71x and the data pattern of the FSK signal detected by the FSK signal detector 71y. When these two data patterns match each other, the operation state decision unit 42 decides in S2 that the operation states of the I/Q modulators 15x and 15y match each other. When these two data patterns are mutually inverted, the operation state decision unit 42 decides in S3 that the operation states of the I/Q modulators 15x and 15y are different from each other.

The decision result of the operation state decision unit 42 is reported to the operation point controller 51 illustrated in FIG. 6. The operation point controller 51 controls the operation states of the I/Q modulators 15x and/or 15y in accordance with the decision result. Namely, when it is decided that the operation states of the I/Q modulators 15x and 15y are different from each other, the operation point controller 51 changes the operation state of one of the I/Q modulators 15x and 15y with one of methods 1-3 described above. As a result, the I/Q modulators 15x and 15y are configured so as to be in the same operation state. Accordingly, a polarization multiplexed optical signal generated by the optical transmitter 1A can be precisely split into polarizations in the optical receiver.

Figure 13:
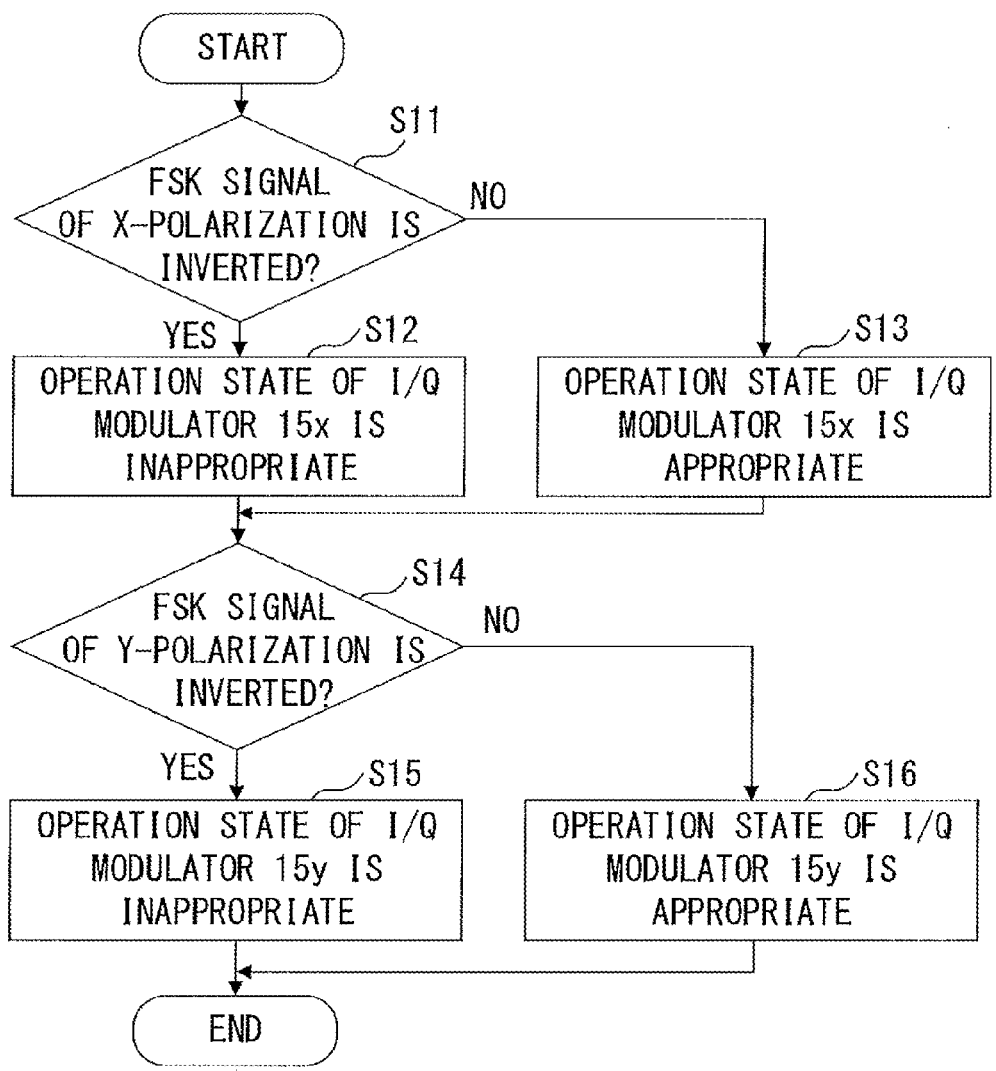
FIG. 13 is a flowchart illustrating another example of a process of deciding an operation state by using an FSK signal.

FIG. 13 is a flowchart illustrating another example of a process of deciding an operation state by using an FSK signal. In this example, it is assumed that a data pattern of an FSK signal superimposed on an electric field information signal is known in advance.

In S11, the operation state decision unit 42 decides whether a data pattern of an FSK signal detected by the FSK signal detector 71x is inverted with respect to a known pattern. When the data pattern of the detected FSK signal is inverted with respect to the known pattern, the operation state decision unit 42 decides in S12 that the I/Q modulator 15x has not been configured so as to be in an expected operation state. When the data pattern of the detected FSK signal matches the known pattern, the operation state decision unit 42 decides in S13 that the I/Q modulator 15x has been configured so as to be in the expected operation state.

Figure 11:
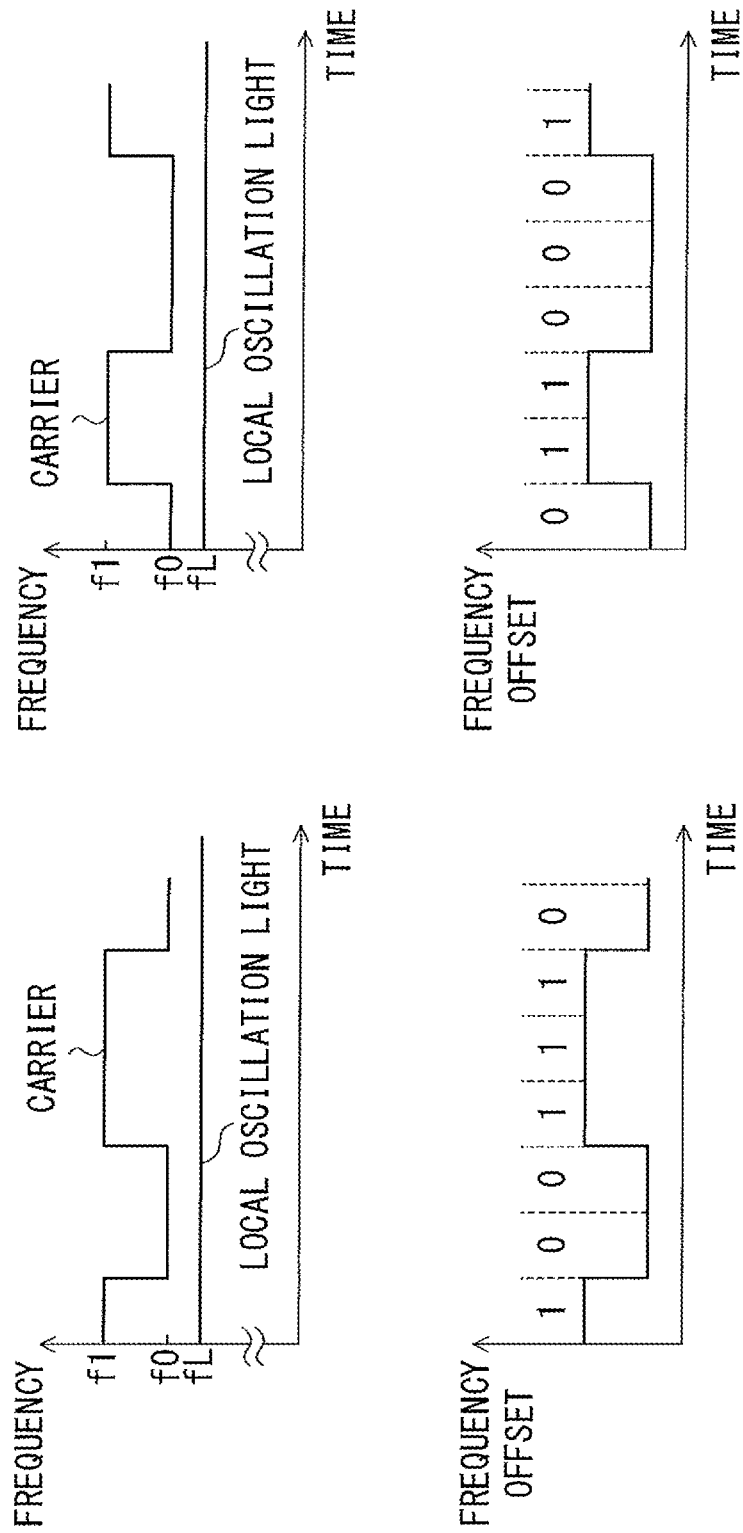
FIGS. 11A and 11B are diagrams illustrating a method for detecting an FSK signal superimposed on an optical signal.

As an example, it is assumed that, in the optical transmitter 1A, the FSK signal "1001110" is superimposed on an electric field information signal by the phase rotation controller 32 and the phase rotation circuit 33. In this case, when the FSK signal illustrated in FIG. 11A is detected by FSK signal detector 71x, the operation state decision unit 42 decides that the I/Q modulator 15x has been configured so as to be in the expected operation state. When the FSK signal illustrated in FIG. 11B is detected by the FSK signal detector 71x, the operation state decision unit 42 decides that the I/Q modulator 15x has not been configured so as to be in the expected operation state.

The processes of S14-S16 are substantially the same as those of S11-S13. Namely, in S14, the operation state decision unit 42 decides whether a data pattern of an FSK signal detected by the FSK signal detector 71y is inverted with respected to a known pattern. When the data pattern of the detected FSK signal is inverted with respect to the known pattern, the operation state decision unit 42 decides in S15 that the I/Q modulator 15y has not been configured so as to be in the expected operation state. When the data pattern of the detected FSK signal matches the known pattern, the operation state decision unit 42 decides in S16 that the I/Q modulator 15y has been configured so as to be in the expected operation state.

The decision results of the operation state decision unit 42 are reported to the operation point controller 51 illustrated in FIG. 6. The operation point controller 51 controls the operation states of the I/Q modulators 15x and/or 15y in accordance with the decision results. Namely, when it is decided that the I/Q modulator 15x has not been configured so as to be in the expected operation state, the operation point controller 51 changes the operation state of the I/Q modulator 15x with one of methods 1-3 described above. When the operation state of the I/Q modulator 15x is the "in-phase state", the operation state of the I/Q modulator 15x is changed to the "inverted state". When the operation state of the I/Q modulator 15x is the "inverted state", the operation state of the I/Q modulator 15x is changed to the "in-phase" state. When it is decided that the I/Q modulator 15y has not been configured so as to be in the expected operation state, the operation point controller 51 changes the operation state of the I/Q modulator 15y with one of methods 1-3 described above.

As described above, when the data pattern of the FSK signal is known, the I/Q modulators 15x and 15y can be configured so as to be in respective desired operation states. Therefore, the optical transmitter 1A can precisely provide respective modulated optical signals multiplexed in a polarization multiplexed optical signal with a desired characteristic (for example, pre-equalization for chromatic dispersion, or the like).

In the example illustrated in FIG. 10, a function of the detector 40 is provided in the optical receiver 2A, but the embodiments are not limited to this configuration. Namely, a monitor circuit that has a function equivalent to the optical receiver 2A illustrated in FIG. 10 may be provided near the optical transmitter 1A. In this case, the monitor circuit can perform coherent detection of a polarization multiplexed optical signal by using the light source 14 as a local oscillation light source. When the transmitter front-end circuit 10 and the monitor circuit are connected via a polarization maintaining fiber, a function for splitting polarizations is not needed.

Second Embodiment

Figure 14:
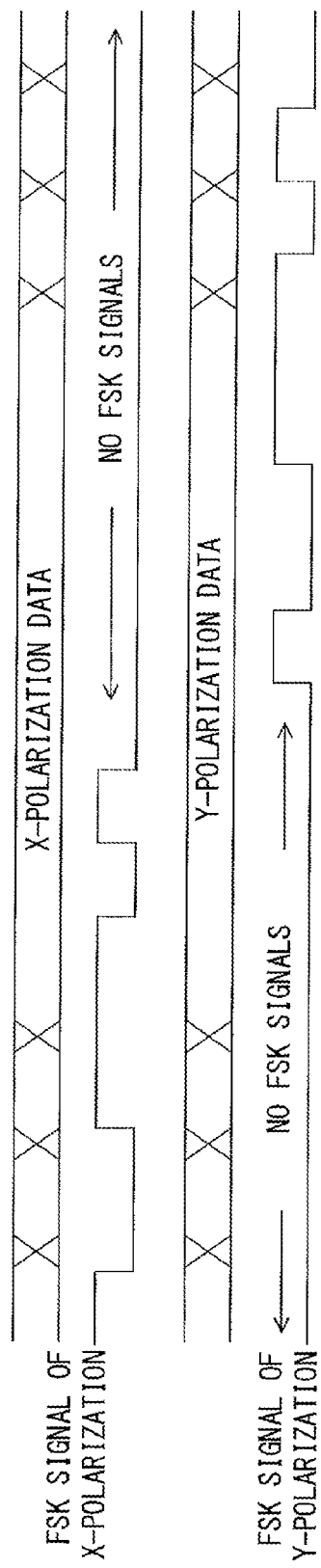
FIG. 14 is a timing chart illustrating a method for detecting an operation state of an I/Q modulator in a second embodiment.

FIG. 14 is a timing chart illustrating a method for detecting the operation states of the I/Q modulators 15x and 15y in a second embodiment. In the second embodiment, an FSK signal is superimposed on an X-polarization and a Y-polarization by time division multiplexing. Namely, when an FSK signal is superimposed on the modulated optical signal X, an FSK signal is not superimposed on the modulated optical signal Y. When an FSK signal is superimposed on the modulated optical signal Y, an FSK signal is not superimposed on the modulated optical signal X.

Figure 15A:
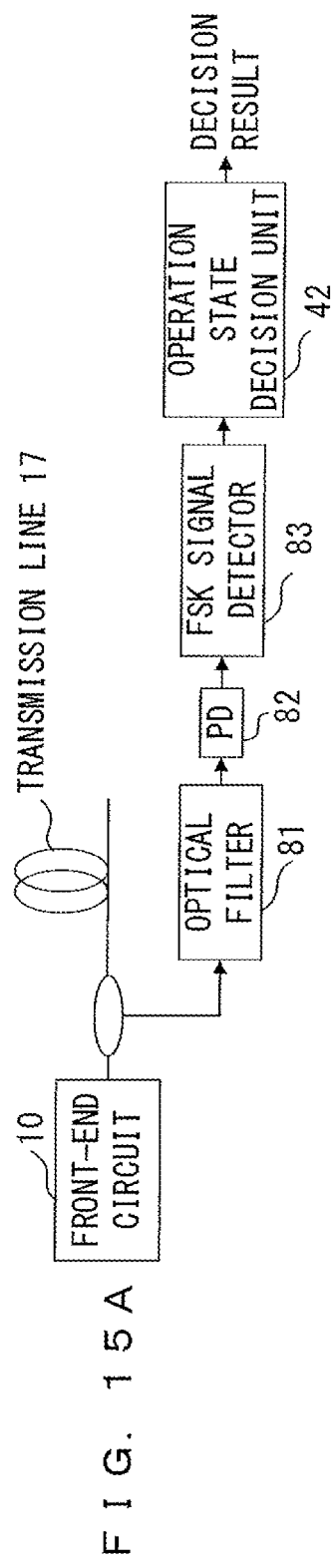
FIGS. 15A and 15B illustrate a configuration and an operation for detecting an operation state of an I/Q modulator in the second embodiment.
Figure 15B:
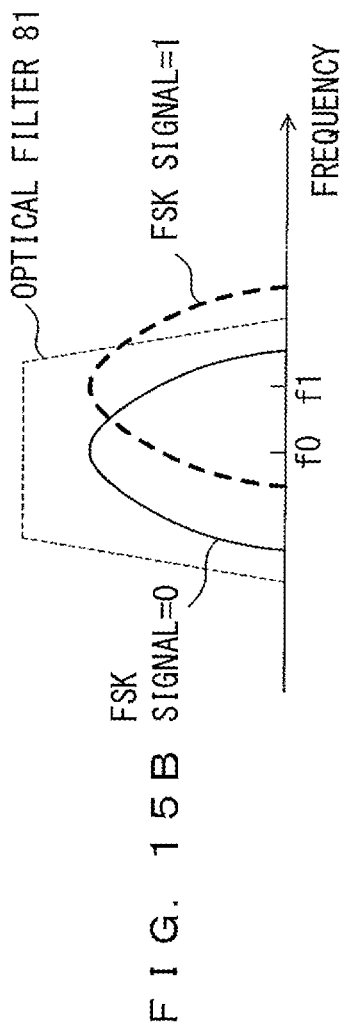

FIGS. 15A and 15B illustrate a configuration and an operation for detecting the operation states of the I/Q modulators 15x and 15y in the second embodiment. A detector according to the second embodiment includes an optical filter 81, a photodetector 82, an FSK signal detector 83, and an operation state decision unit 42, as illustrated in FIG. 15A. A polarization multiplexed optical signal generated by the transmitter front-end circuit 10 is split by an optical splitter, and is guided to the optical filter 81. The optical filter 81, the photodetector 82, and the FSK signal detector 83 are examples of the carrier frequency detector 41 illustrated in FIG. 6.

The optical filter 81 is a band-pass filter that passes a specified frequency. Here, when an FSK signal is superimposed on the modulated optical signal X (or the modulated optical signal Y), it is assumed that a spectrum of the modulated optical signal X fluctuates as illustrated in FIG. 15B. In this example, when a bit of the FSK signal is "0", the center frequency of a carrier of the modulated optical signal X is f0, and when a bit of the FSK signal is "1", the center frequency of the carrier of the modulated optical signal X is f1. In this case, a center frequency of a pass band of the optical filter 81 is set, for example, to f0. As a result, a power of an optical signal output from the optical filter 81 varies with the FSK signal.

The photodetector 82 is configured so as to include a photodiode, and converts an optical signal output from the optical filter 81 into an electrical signal. Therefore, a signal output from the photodetector 82 varies with the FSK signal. The FSK signal detector 83 detects the FSK signal according to the signal output from the photodetector 82. The FSK signal detector 83 detects an FSK signal superimposed on the modulated optical signal X and an FSK signal superimposed on the modulated optical signal Y at different timings.

The operations of the operation state decision unit 42 in the second embodiment are substantially the same as the operations in the first embodiment. Namely, the operation state decision unit 42 can decide the operation states of the I/Q modulators 15x and 15y in accordance with the FSK signal detected by the FSK signal detector 83. Alternatively, the operation state decision unit 42 can decide whether the operation states of the I/Q modulators 15x and 15y are the same as each other in accordance with the detected FSK signal.

As described above, in the second embodiment, the operation states of the I/Q modulators 15x and 15y can be decided without performing coherent detection. Namely, a method according to the second embodiment can control the operation states of the I/Q modulators 15x and 15y with a simpler and less expensive configuration than that of the first embodiment.

Third Embodiment

Figure 16:
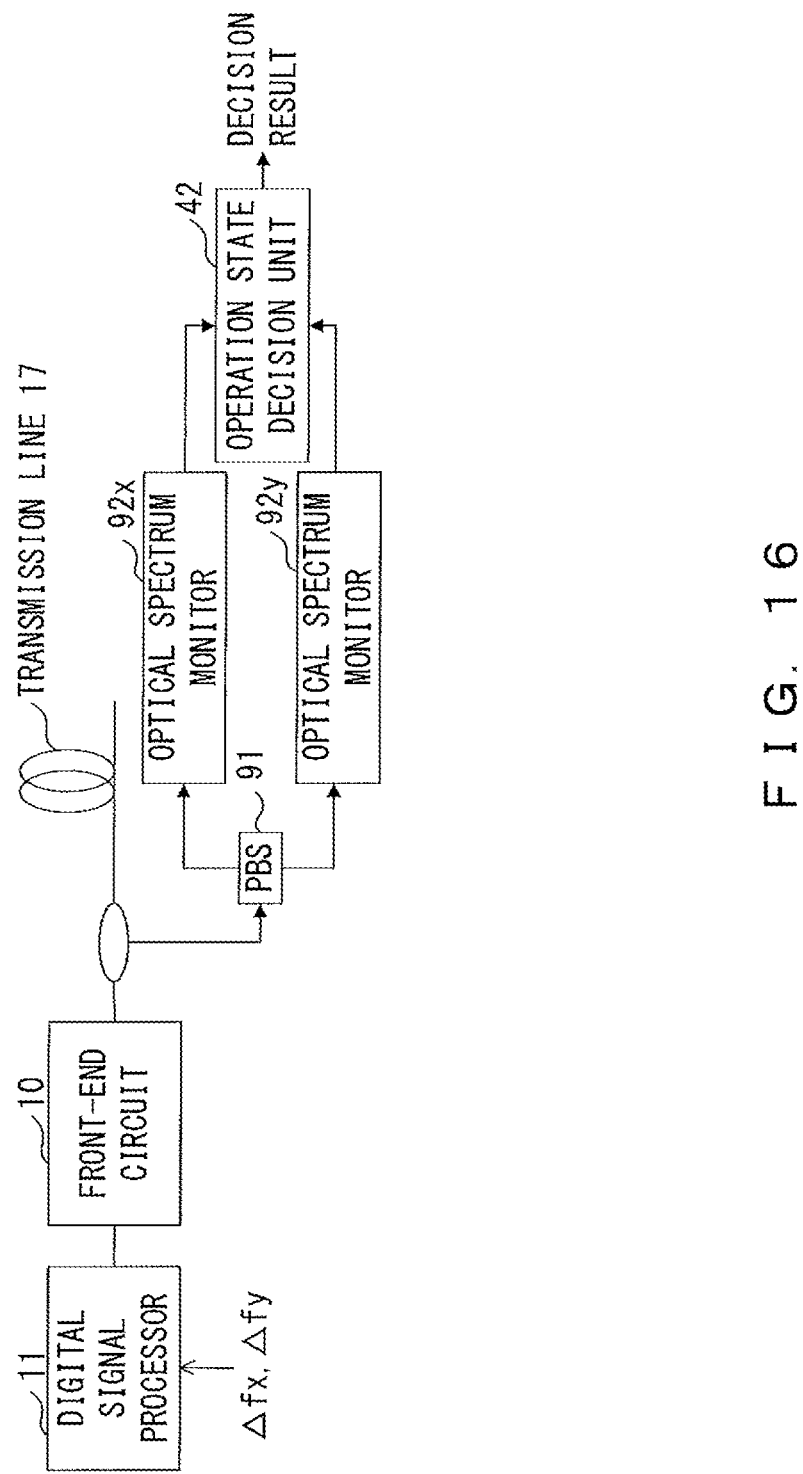
FIG. 16 illustrates a configuration for detecting an operation state of an I/Q modulator in a third embodiment.

FIG. 16 illustrates a configuration for detecting the operation states of the I/Q modulators 15x and 15y in a third embodiment. A detector according to the third embodiment includes a polarization beam splitter (PBS) 91, optical spectrum monitors 92x and 92y, and an operation state decision unit 42, as illustrated in FIG. 16. A polarization multiplexed optical signal generated by the transmitter front-end circuit 10 is split by an optical splitter, and is guided to the polarization beam splitter 91. The polarization beam splitter 91 and the optical spectrum monitors 92x and 92y are an example of the carrier frequency detector 41 illustrated in FIG. 6.

In the third embodiment, the optical transmitter 1A shifts respective carrier frequencies of the modulated optical signals X and Y. The shift in the carrier frequencies is realized by adding a phase rotation to an electric field information signal in the phase rotation controller 32 and the phase rotation circuit 33. Namely, a phase rotation that corresponds to a frequency of Δfx is added to the electric field information signal XI, XQ. A phase rotation that corresponds to a frequency of Δfy is added to the electric field information signal YI, YQ. Therefore, the carrier frequency of the modulated optical signal X generated by the I/Q modulator 15x is shifted by Δfx with respect to a reference frequency. The carrier frequency of the modulated optical signal Y generated by the I/Q modulator 15y is shifted by Δfy with respect to the reference frequency. The reference frequency is, for example, a frequency of continuous wave light generated by the light source 14.

A direction of the shift in the carrier frequency depends on the operation states of the I/Q modulators 15x and 15y. As an example, when the I/Q modulator 15x operates in the in-phase state, the carrier frequency of the modulated optical signal X is shifted by Δfx in a positive direction with respect to the reference frequency. When the I/Q modulator 15x operates in the inverted state, the carrier frequency of the modulated optical signal X is shifted by Δfx in a negative direction with respect to the reference frequency. A similar frequency shift is performed on the modulated optical signal Y.

The polarization beam splitter 91 splits the polarization multiplexed optical signal output from the transmitter front-end circuit 10 into an X-polarization signal and a Y-polarization signal. Namely, the modulated optical signal X and the modulated optical signal Y are obtained by the polarization beam splitter 91. In a configuration in which polarization is maintained between the transmitter front-end circuit 10 and the polarization beam splitter 91, the polarization beam splitter 91 can precisely split the X-polarization and the Y-polarization.

The optical spectrum monitor 92x monitors a frequency spectrum of the modulated optical signal X obtained by the polarization beam splitter 91. The optical spectrum monitor 92x then detects whether the carrier frequency of the modulated optical signal X is shifted by +Δfx or −Δfx with respect to the reference frequency. Similarly, the optical spectrum monitor 92y detects whether the carrier frequency of the modulated optical signal Y is shifted by +Δfy or −Δfy with respect to the reference frequency.

Figure 17:
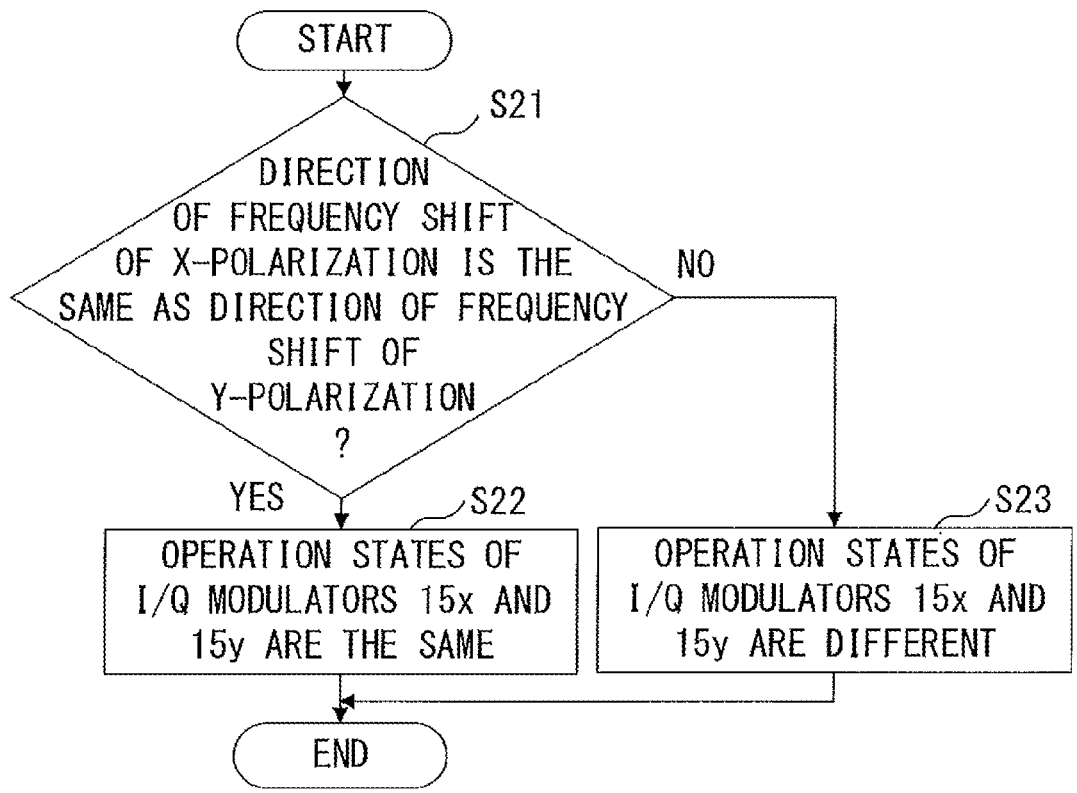
FIG. 17 is a flowchart illustrating an example of a process of deciding an operation state by using a frequency shift.

FIG. 17 is a flowchart illustrating an example of a process of deciding an operation state by using a frequency shift. In this example, Δfx and Δfy are the same as each other.

In S21, the operation state decision unit 42 compares a direction of a carrier frequency shift of the modulated optical signal X with a direction of a carrier frequency shift of the modulated optical signal Y. When these two directions of the carrier frequency shifts are the same as each other, the operation state decision unit 42 decides in S22 that the operation states of the I/Q modulators 15x and 15y match each other. When the above two directions of the carrier frequency shifts are different from each other, the operation state decision unit 42 decides in S23 that the operation states of the I/Q modulators 15x and 15y do not match each other.

The procedure of controlling the operation states of the I/Q modulators 15x and/or 15y in accordance with the decision result of the operation state decision unit 42 is similar to the procedure in the first embodiment.

Figure 18:
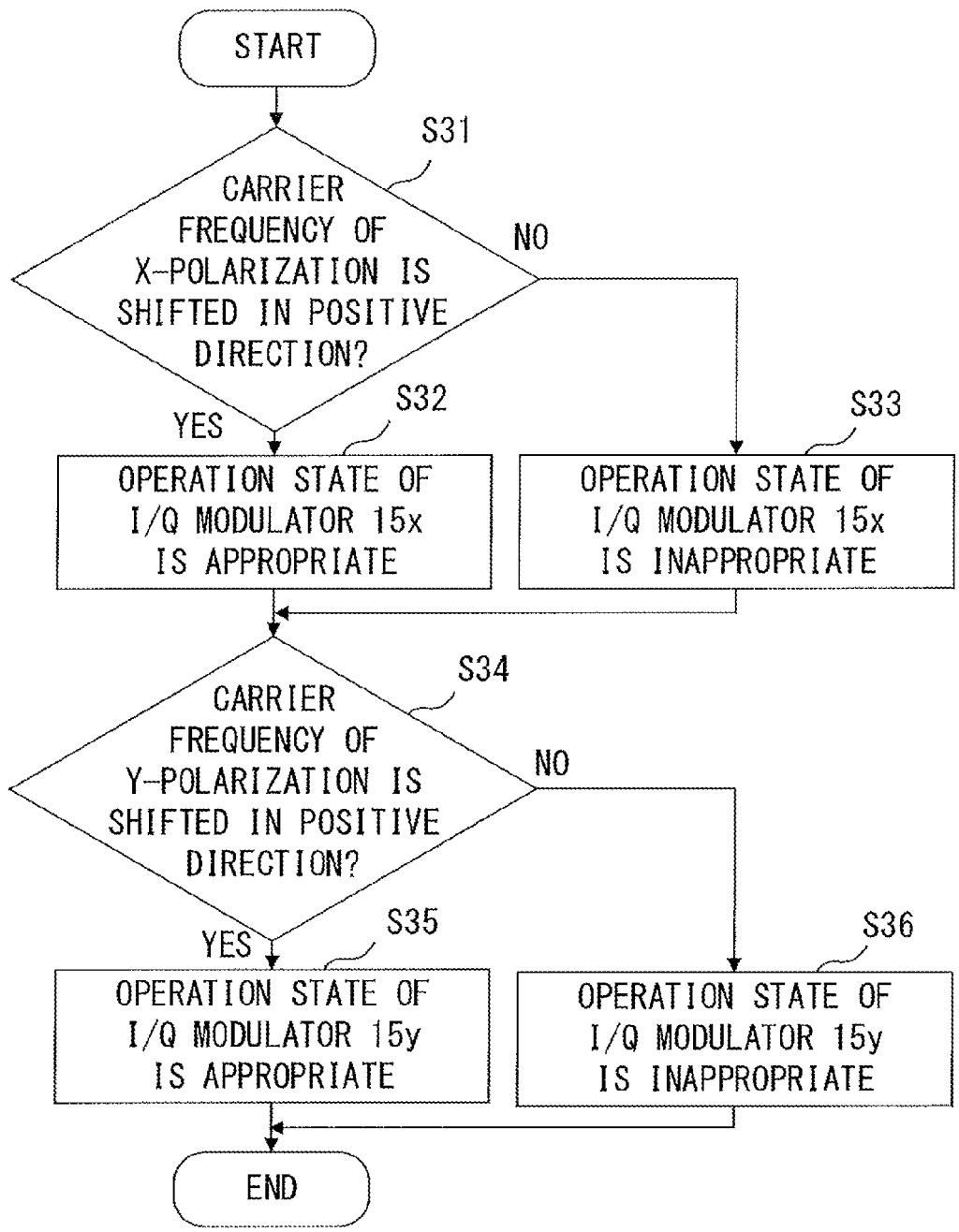
FIG. 18 is a flowchart illustrating another example of a process of deciding an operation state by using a frequency shift.

FIG. 18 is a flowchart illustrating another example of a process of deciding an operation state by using a frequency shift. In this example, Δfx and Δfy may be the same as each other, or may be different from each other.

In S31, the operation state decision unit 42 detects the carrier frequency shift of the modulated optical signal X. When the carrier frequency of the modulated optical signal X is shifted by +Δfx with respect to the reference frequency (or when the carrier frequency is shifted in positive direction), the operation state decision unit 42 decides in S32 that the I/Q modulator 15x has been configured so as to be in an expected operation state. When the carrier frequency of the modulated optical signal X is shifted by −Δfx with respect to the reference frequency (or when the carrier frequency is shifted in negative direction), the operation state decision unit 42 decides in S33 that the I/Q modulator 15x has not been configured so as to be in an expected operation state.

The processes of S34-S36 are substantially the same as those of S31-S33. Namely, in S34, the operation state decision unit 42 detects a carrier frequency shift of the modulated optical signal Y. When the carrier frequency of the modulated optical signal Y is shifted by +Δfy with respect to the reference frequency (or when the carrier frequency is shifted in positive direction), the operation state decision unit 42 decides in S35 that the I/Q modulator 15y has been configured so as to be in an expected operation state. When the carrier frequency of the modulated optical signal Y is shifted by −Δfy with respect to the reference frequency (or when the carrier frequency is shifted in negative direction), the operation state decision unit 42 decides in S36 that the I/Q modulator 15y has not been configured so as to be in an expected operation state. The procedure of controlling the operation states of the I/Q modulators 15x and/or 15y in accordance with the decision result of the operation state decision unit 42 is substantially the same as the procedure in the first embodiment.

Fourth Embodiment

Figure 19:
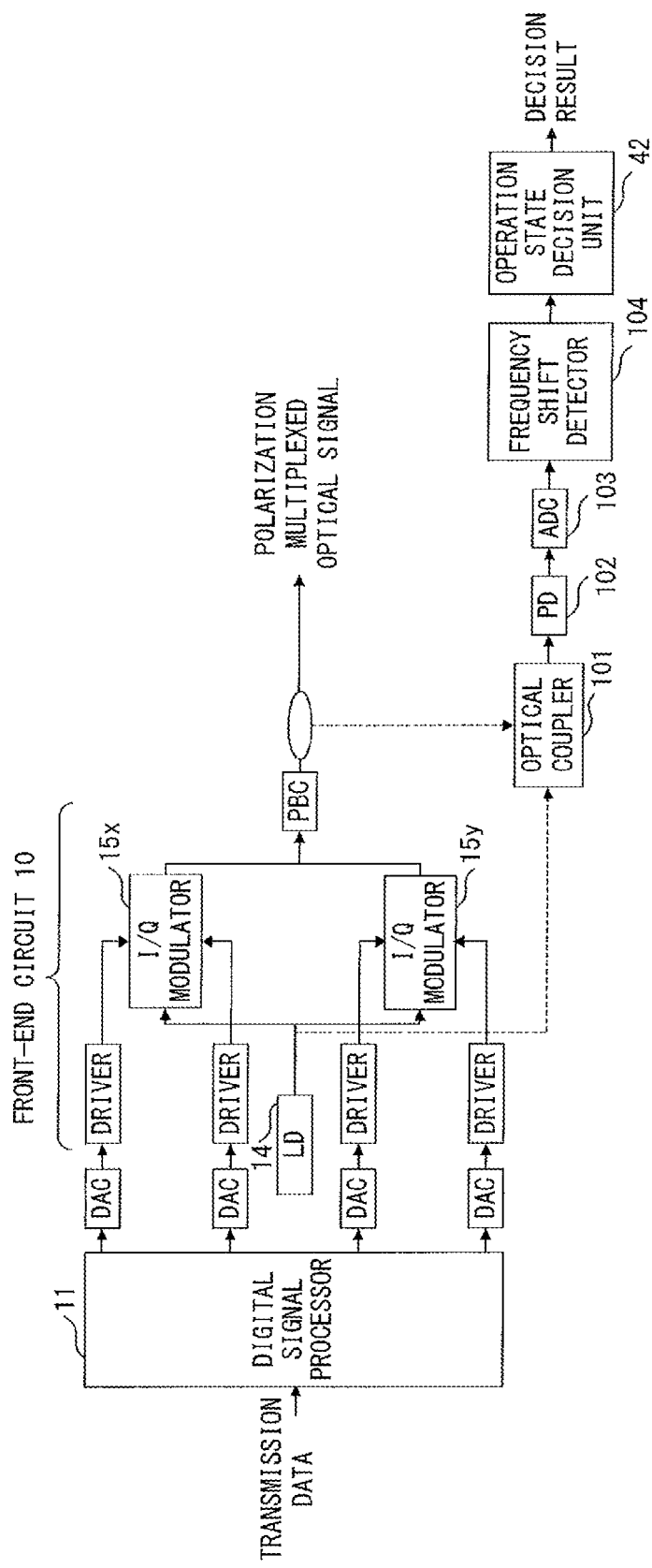
FIG. 19 illustrates an example of a configuration of an optical transmitter according to a fourth embodiment.

FIG. 19 illustrates an example of a configuration of an optical transmitter according to a fourth embodiment. In the fourth embodiment, a detector that detects the operation states of the I/Q modulators 15x and 15y includes an optical coupler 101, a photodetector 102, an A/D converter 103, a frequency shift detector 104, and an operation state decision unit 42. The optical coupler 101, the photodetector 102, the A/D converter 103, and the frequency shift detector 104 are an example of the carrier frequency detector 41 illustrated in FIG. 6.

The optical coupler 101 combines a polarization multiplexed optical signal output from the transmitter front-end circuit 10 and continuous wave light output from the light source 14. The polarization multiplexed optical signal output from the transmitter front-end circuit 10 is generated by modulating the continuous wave light output from the light source 14. Therefore, a baseband component of the polarization multiplexed optical signal is extracted by combining the polarization multiplexed optical signal and the continuous wave light. The photodetector 102 converts an optical signal output from the optical coupler 101 into an electrical signal. The A/D converter 103 converts an output signal of the photodetector 102 into a digital signal. Accordingly, the digital signal output from the A/D converter 103 indicates the baseband component of the polarization multiplexed optical signal.

The frequency shift detector 104 detects respective carrier frequency shifts of the modulated optical signals X and Y multiplexed into the polarization multiplexed optical signal in accordance with the digital signal described later. The operation state decision unit 42 decides the operation states of the I/Q modulators 15x and 15y in accordance with the detected carrier frequency shifts.

Figure 20:
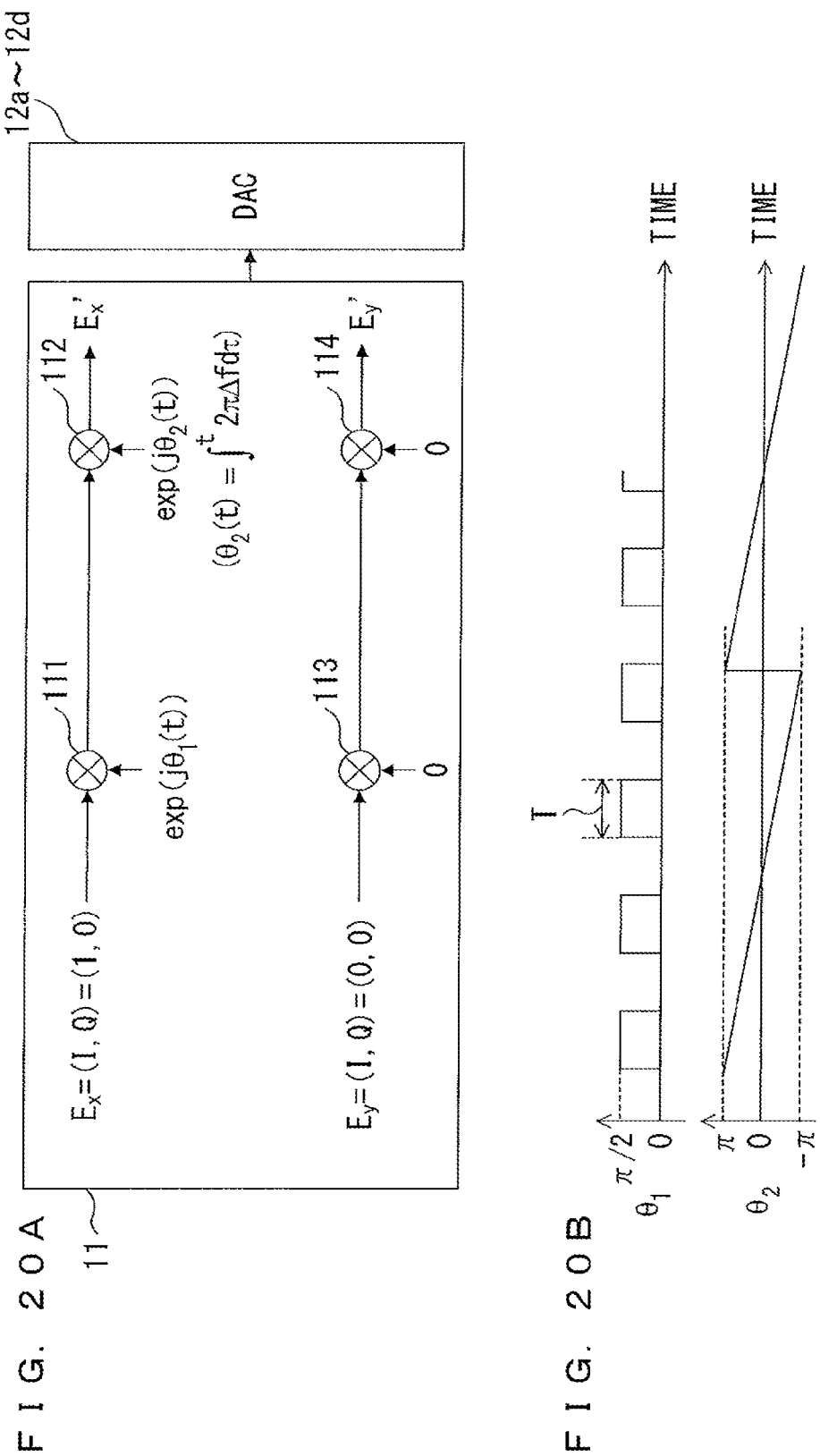
FIGS. 20A and 20B are diagrams illustrating an operation according to the fourth embodiment.

FIGS. 20A and 20B are diagrams illustrating an operation according to the fourth embodiment. FIG. 20A illustrates a process of the digital signal processor 11 for detecting the operation state of the I/Q modulator 15x.

The digital signal processor 11 generates an electric field information signal that corresponds to a specified test pattern. In the example illustrated in FIG. 20A, (1, 0) is generated as the electric field information signal EX (XI, XQ) for driving the I/Q modulator 15x, and (0, 0) is generated as the electric field information signal EY (YI, YQ) for driving the I/Q modulator 15y.

In the example illustrated in FIGS. 20A and 20B, a specified test pattern is continuously generated, but the embodiments are not limited to this scheme. As an example, a test pattern may be inserted into transmission data. However, in this case, a synchronization process for detecting a position at which the test pattern is inserted is needed.

A multiplier 111 multiplies the electric field information signal EX by rotation function 1 "$\exp(j\theta_1(t))$". Rotation function 1 alternately repeats "0" and "$\pi/2$" at each time slot T, as illustrated in FIG. 20B. A multiplier 112 multiplies the electric field information signal EX by rotation function 2 "$\exp(j\theta_2(t))$". Rotation function 2 expresses a constant phase rotation that corresponds to a frequency shift Δf, as illustrated in FIG. 20B. It is preferable that a frequency shift amount Δf be sufficiently small with respect to a cycle 1/T of rotation function 1 such that a phase change amount according to rotation function 2 during a time slot T is sufficiently small. In the example illustrated in FIG. 20A, the electric field information signal is multiplied by rotation functions 1 and 2 by using two multipliers, but the electric field information signal may be multiplied by the sum of rotation functions 1 and 2 by using one multiplier. Multipliers 113 and 114 do not add a phase rotation to the electric field information signal EY. In FIG. 20A, "0" given to the multipliers 113 and 114 expresses that the phase rotation is zero.

The transmitter front-end circuit 10 generates a polarization multiplexed optical signal including the modulated optical signal X and the modulated optical signal Y in accordance with the electric field information signals X and Y that are generated by the digital signal processor 11 as described above. The polarization multiplexed optical signal is combined with the continuous wave light output from the light source 14 in the optical coupler 101, as described above.

A phase of the modulated optical signal Y is constant. Therefore, a power of combined light of the modulated optical signal Y and the continuous wave light is substantially constant. On the other hand, a phase of the modulated optical signal X varies according to rotation function 1 and rotation function 2 illustrated in FIG. 20. Therefore, a power of combined light of the modulated optical signal X and the continuous wave light varies according to rotation function 1 and rotation function 2. Accordingly, when a polarization multiplexed optical signal and continuous wave light are combined by using the optical coupler 101, a power of the output light (i.e., an intensity of the combined light) varies according to rotation function 1 and rotation function 2.

Figure 21:
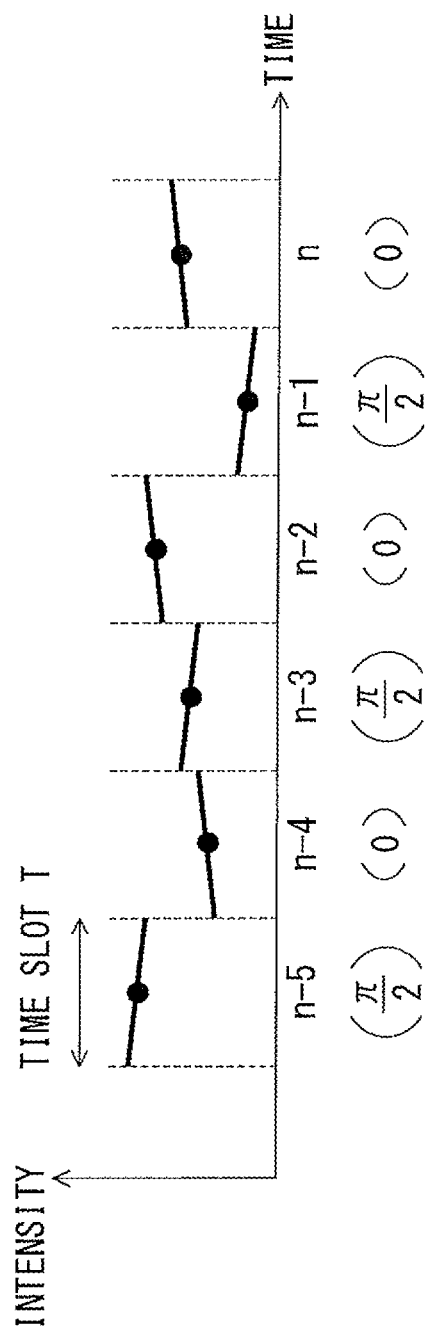
FIG. 21 illustrates detection of an intensity of combined light of a polarization multiplexed optical signal and continuous wave light.

FIG. 21 illustrates detection of an intensity of combined light of a polarization multiplexed optical signal and continuous wave light. In this example, in time slots n, n−2, and n−4, rotation function 1 is "0", and in time slots n−1, n−3, and n−5, rotation function 1 is "π/2". In this case, an intensity of combined light expresses an I component of the modulated optical signal X in time slots n, n−2, and n−4, and expresses a Q component of the optical modulation single X in time slots n−1, n−3, and n−5. Therefore, when the intensity of the combined light is detected in two consecutive time slots, electric field information expressed by the following expression is obtained.

$$E=I+jQ=P(i)+jP(i+1)$$

P(i) and P(i+1) express intensities detected in time slots i and i+1, respectively. i is an integer, and is n, n−2, n−4, . . . , in the example illustrated in FIG. 21.

The frequency shift detector 104 detects an intensity of the combined light in respective time slots. The frequency shift detector 104 calculates a phase angle Angle of a carrier by using a pair of detection values detected in two consecutive time slots. As an example, the following phase angle Angle(1) is obtained from detection values in time slots n−4 and n−3.

$$\text{Angle}(1)=\arctan \{P(n-3)/P(n-4)\}$$

Similarly, the following phase angle Angle(2) is obtained from detection values in time slots n−2 and n−1.

$$\text{Angle}(2)=\arctan \{P(n-1)/P(n-2)\}$$

A change in a phase angle during a time period (i.e., 2T) that corresponds to two time slots is expressed by a difference between Angle(1) and Angle(2). Therefore, a frequency shift Δf_det that is estimated from the detection values of the light intensity is expressed by the following expression.

$$\Delta f\_det=\{\text{Angle}(2)-\text{Angle}(1)\}/(2T*2\pi)$$

As described above, the frequency shift detector 104 detects the frequency shift of the modulated optical signal X. The operation state decision unit 42 compares the frequency shift Δf that corresponds to rotation function 2 added in the digital signal processor 11 and the frequency shift Δf_det that is detected by the frequency shift detector 104, and detects the operation state of the I/Q modulator 15x according to the comparison result.

When Δf matches Δf_det, the operation state decision unit 42 decides that the I/Q modulator 15x has been configured so as to be in an expected operation state. When Δf does not match Δf_det (for example, when Δf=−Δf_det), the operation state decision unit 42 decides that the I/Q modulator 15x has not been configured so as to be in an expected operation state. The procedure of controlling the operation state of the I/Q modulator 15x in accordance with the decision result of the operation state decision unit 42 is substantially the same as the procedure in the first embodiment.

When detecting the operation state of the I/Q modulator 15y, the digital signal processor 11 multiplies the electric field information signal EY for driving the I/Q modulator 15y by rotation function 1 and rotation function 2. Here, the electric field information signal EX for driving the I/Q modulator 15x is multiplied by "0". The process of the frequency shift detector 104 is substantially the same as the process of detecting the frequency shift in the modulated optical signal X.

Fifth Embodiment

FIG. 22 illustrates an example of a configuration of an optical transmitter according to a fifth embodiment. The configuration of the optical transmitter according to the fifth embodiment is similar to the configuration according to the fourth embodiment illustrated in FIG. 19. However, in the fifth embodiment, a polarization multiplexed optical signal generated by the transmitter front-end circuit 10 is guided to a polarizer 121. The polarizer 121 is configured so as to have 45 degrees with respect to the X-polarization axis and the Y-polarization axis of the polarization multiplexed optical signal.

FIGS. 23A and 23B are diagrams illustrating an operation according to the fifth embodiment. FIG. 23A illustrates a process of the digital signal processor 11 for detecting the operation state of the I/Q modulator 15x.

The processes of the digital signal processor 11 according to the fourth embodiment and the fifth embodiment are similar to each other. However, in the fifth embodiment, as illustrated in FIG. 23A and FIG. 23B, the electric field information signal EY for driving the I/Q modulator 15y is multiplied by rotation function 1, and the electric field information signal EX for driving the I/Q modulator 15x is multiplied by rotation function 2.

The transmitter front-end circuit 10 generates a polarization multiplexed optical signal including the modulated optical signal X and the modulated optical signal Y in accordance with the electric field information signals EX and EY that are generated by the digital signal processor 11 as described above. The polarization multiplexed optical signal is guided to the polarizer 121.

As described above, the polarizer 121 is configured so as to have 45 degrees with respect to the X-polarization axis and the Y-polarization axis of the polarization multiplexed optical signal. Therefore, the modulated optical signal X and the modulated optical signal Y included in the polarization multiplexed optical signal are combined in the polarizer 121. Accordingly, in a time slot in which "phase=0" is given to the modulated optical signal Y, an output power of the polarizer 121 expresses an I component of the modulated optical signal X. In a time slot in which "phase=π/2" is given to the modulated optical signal Y, an output power of the polarizer 121 expresses a Q component of the modulated optical signal X. Namely, also in the fifth embodiment, information equivalent to an output of the optical coupler 101 in the fourth embodiment can be obtained.

The operations of the frequency shift detector 104 and the operation state decision unit 42 in the fifth embodiment are substantially the same as the operations in the fourth embodiment. When detecting the operation state of the I/Q modulator 15y, in the digital signal processor 11, the electric field information signal EX for driving the I/Q modulator 15x is multiplied by rotation function 1, and the electric field information signal EY for driving the I/Q modulator 15y is multiplied by rotation function 2.

Sixth Embodiment

Figure 24:
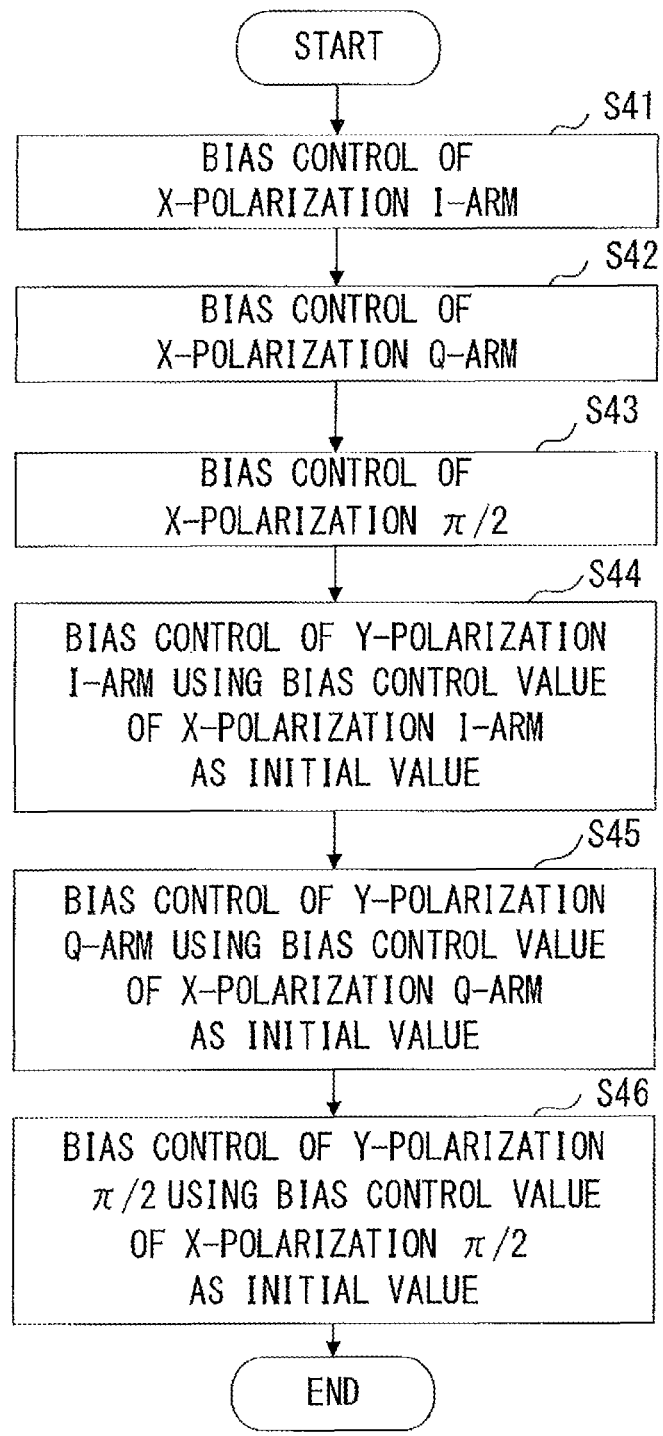
FIG. 24 is a flowchart illustrating a process of controlling a bias of an I/Q modulator in a sixth embodiment.

FIG. 24 is a flowchart illustrating a process of controlling a bias of an I/Q modulator in a sixth embodiment. In the sixth embodiment, the I/Q modulators 15x and 15y are configured so as to be in the same operation state by controlling biases of the I/Q modulators 15x and 15y.

In S41, the bias controller 52 controls a bias of an X-polarization I-arm. Namely, the bias controller 52 controls a bias voltage applied to the I-arm such that an operation point of the I-arm of the I/Q modulator 15x is set so as to match a specified null point (for example, the null point A illustrated in FIG. 2).

In S42, the bias controller 52 controls a bias of an X-polarization Q-arm. Namely, the bias controller 52 controls a bias voltage applied to the Q-arm such that an operation point of the Q-arm of the I/Q modulator 15x is set so as to match a specified null point (for example, the null point A illustrated in FIG. 2).

In S43, the bias controller 52 controls a bias of an X-polarization phase shifter. Namely, the bias controller 52 controls a bias voltage applied to the phase shifter 1003 such that a phase difference between the I-arm and the Q-arm of the I/Q modulator 15x is set to a specified value (for example, $\pi/2$).

In S44, the bias controller 52 controls a bias of a Y-polarization I-arm. The bias controller 52 controls an I-arm bias voltage of the I/Q modulator 15y such that an operation point of the I-arm of the I/Q modulator 15y is set so as to match a null point, by using a bias voltage of an I-arm of the I/Q modulator 15x as an initial value. In the I-arm bias control of the I/Q modulator 15y, when the bias voltage of the I-arm of the I/Q modulator 15x is given as an initial value, the operation point of the I-arm of the I/Q modulator 15y is likely to converge at the same null point as the null point of the operation point of the I-arm of the I/Q modulator 15x. Therefore, the operation points of the I-arms of the I/Q modulators 15x and 15y are set so as to match the same minimum point.

In S45, the bias controller 52 controls a bias of a Y-polarization Q-arm. The bias controller 52 controls a Q-arm bias voltage of the I/Q modulator 15y such that an operation point of the Q-arm of the I/Q modulator 15y is set so as to match a null point, by using a bias voltage of a Q-arm of the I/Q modulator 15x as an initial value. In the Q-arm bias control of the I/Q modulator 15y, when the bias voltage of the Q-arm of the I/Q modulator 15x is given as an initial value, the operation point of the Q-arm of the I/Q modulator 15y is likely to converge at the same null point as the null point of the operation point of the Q-arm of the I/Q modulator 15x. Therefore, the operation points of the Q-arms of the I/Q modulators 15x and 15y are set so as to match the same null point.

In S46, the bias controller 52 controls a bias of a Y-polarization phase shifter. The bias controller 52 controls a bias voltage of the phase shifter 1003 of the I/Q modulator 15y such that a phase difference between the I-arm and the Q-arm of the I/Q modulator 15y is set to $\pi/2$ or $3\pi/2$, by using a bias voltage of the phase shifter 1003 of the I/Q modulator 15x as an initial value. In the bias control of the phase shifter of the I/Q modulator 15y, when the bias voltage of the phase shifter of the I/Q modulator 15x is given as an initial value, a phase shift amount of the I/Q modulator 15y is likely to converge to the same value of a phase shift amount of the I/Q modulator 15x. Therefore, the phase shifters 1003 of the I/Q modulators 15x and 15y are set to have the same value.

A method for controlling biases of an I-arm and a Q-arm is described, for example, in Japanese Laid-open Patent Publication No. 2000-162563. In addition, a method for controlling a bias of a phase shifter is described, for example, in Japanese Laid-open Patent Publication No. 2007-082094.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter comprising:
   a mapper that generates an electric field information signal from transmission data;
   a phase rotation circuit that adds a phase rotation to the electric field information signal;
   a driver that generates a driving signal from the electric field information signal to which the phase rotation is added;
   a modulator that generates a modulated optical signal according to the driving signal;
   a detector that detects a carrier frequency of the modulated optical signal; and
   a controller that controls a bias of the modulator according to a change in the carrier frequency of the modulated optical signal, the carrier frequency being detected by the detector, and the change in the carrier frequency corresponding to the phase rotation that is added to the electric field information signal by the phase rotation circuit.

2. The optical transmitter according to claim 1, wherein the phase rotation circuit adds, to the electric field information signal, a phase rotation corresponding to an FSK (Frequency Shift Keying) signal that indicates a specified data pattern so as to superimpose the FSK signal on the driving signal,
   the detector monitors the change in the carrier frequency of the modulated optical signal and detects the FSK signal superimposed on the modulated optical signal, and
   the controller changes the bias of the modulator when the FSK signal detected from the modulated optical signal is inverted with respect to the FSK signal superimposed on the driving signal.

3. The optical transmitter according to claim 2, wherein the modulator is a Mach-Zehnder modulator that includes a first-arm modulator and a second-arm modulator, and
   when the FSK signal detected from the modulated optical signal is inverted with respect to the FSK signal superimposed on the driving signal, the controller controls a bias voltage of the first-arm modulator to shift an operation point of the first-arm modulator so as to match a next null point.

4. The optical transmitter according to claim 2, wherein the modulator is a Mach-Zehnder modulator that includes a first-arm modulator, a second-arm modulator, and
   a phase shifter that gives a specified phase difference between the first-arm modulator and the second-arm modulator, and when the FSK signal detected from the modulated optical signal is inverted with respect to the FSK signal superimposed on the driving signal, the controller controls a bias voltage of the phase shifter to change the phase difference between the first-arm modulator and the second-arm modulator by $\pi$.

5. The optical transmitter according to claim 2, wherein the detector generates electric field information of the modulated optical signal by coherent detection, monitors the change in the carrier frequency of the modulated optical signal by using the electric field information, and detects the FSK signal superimposed on the modulated optical signal.

6. The optical transmitter according to claim 2, wherein the detector detects the FSK signal superimposed on the modulated optical signal by using an optical band-pass filter.

7. The optical transmitter according to claim 1, wherein
the phase rotation circuit adds a phase rotation to the electric field information signal such that the carrier frequency of the modulated optical signal generated by the modulator is shifted in a specified direction,
the detector detects the carrier frequency of the modulated optical signal, and
the controller changes the bias of the modulator when the carrier frequency of the modulated optical signal is shifted in a direction reverse to the specified direction.

8. An optical transmitter comprising:
a mapper that generates an electric field information signal from transmission data;
a phase rotation circuit that adds a phase rotation to the electric field information signal;
a driver that generates a driving signal from the electric field information signal to which the phase rotation is added;
a modulator that generates a modulated optical signal according to the driving signal; and
a controller that controls a bias of the modulator according to a change in a carrier frequency of the modulated optical signal corresponding to the phase rotation that is added to the electric field information signal by the phase rotation circuit, wherein
the change in the carrier frequency of the modulated optical signal is detected in an optical receiver that receives the modulated optical signal.

9. An optical transmitter comprising:
a mapper that generates an electric field information signal from transmission data;
a phase rotation circuit that adds a phase rotation to the electric field information signal;
a driver that generates a driving signal from the electric field information signal to which the phase rotation is added;
a modulator that generates a modulated optical signal according to the driving signal; and
a controller that controls the electric field information signal according to a carrier frequency of the modulated optical signal, wherein
the electric field information signal indicates an in-phase component and a quadrature component of the modulated optical signal, and when a direction of a change in the carrier frequency of the modulated optical signal that is caused by the phase rotation added to the electric field information signal is reverse to a direction that corresponds to a direction of the phase rotation added to the electric field information signal, the controller inverts a sign of one of the in-phase component or the quadrature component of the modulated optical signal.

10. An optical transmitter comprising:
a mapper that generates a first electric field information signal and a second electric field information signal;
a phase rotation circuit that adds a phase rotation to the first electric field information signal and the second electric field information signal;
a driver that generates a first driving signal and a second driving signal from the first electric field information signal and the second electric field information signal to which the phase rotation is added;
a light source that generates continuous wave light;
a first modulator that modulates the continuous wave light with the first driving signal to generate a first modulated optical signal;
a second modulator that modulates the continuous wave light with the second driving signal to generate a second modulated optical signal;
a polarization beam combiner that combines the first modulated optical signal and the second modulated optical signal to generate a polarization multiplexed optical signal;
a controller that sets an operation point of the first modulator and an operation point of the second modulator so as to match the same null point in accordance with a change in a carrier frequency of the first modulated optical signal included in the polarization multiplexed optical signal and a change in a carrier frequency of the second modulated optical signal included in the polarization multiplexed optical signal;
an optical coupler that combines the polarization multiplexed optical signal and the continuous wave light; and
a detector that detects frequencies of the first modulated optical signal and the second modulated optical signal in accordance with an intensity of output light of the optical coupler, wherein
when the phase rotation circuit multiplies the first electric field information signal by a first function for alternately adding a phase rotation of zero and a phase rotation of π/2 at specified time intervals and a second function for adding a phase rotation that corresponds to a specified carrier frequency shift, the detector detects a shift in the carrier frequency of the first modulated optical signal with respect to a frequency of the continuous wave light in accordance with the intensity of the output light of the optical coupler when the phase rotation according to the first function is zero and in accordance with the intensity of the output light of the optical coupler when the phase rotation according to the first function is π/2,
when the phase rotation circuit multiplies the second electric field information signal by the first function and the second function, the detector detects a shift in the carrier frequency of the second modulated optical signal with respect to the frequency of the continuous wave light in accordance with the intensity of the output light of the optical coupler when the phase rotation according to the first function is zero and in accordance with the intensity of the output light of the optical coupler when the phase rotation according to the first function is π/2, and
the controller controls a bias of the first modulator in accordance with a direction of the shift in the carrier frequency of the first modulated optical signal, and controls a bias of the second modulator in accordance with a direction of the shift in the carrier frequency of the second modulated optical signal.

11. An optical transmitter comprising:
a mapper that generates a first electric field information signal and a second electric field information signal;
a phase rotation circuit that adds a phase rotation to the first electric field information signal and the second electric field information signal;
a driver that generates a first driving signal and a second driving signal from the first electric field information signal and the second electric field information signal to which the phase rotation is added;
a light source that generates continuous wave light;

a first modulator that modulates the continuous wave light with the first driving signal to generate a first modulated optical signal;
a second modulator that modulates the continuous wave light with the second driving signal to generate a second modulated optical signal;
a polarization beam combiner that combines the first modulated optical signal and the second modulated optical signal to generate a polarization multiplexed optical signal;
a controller that sets an operation point of the first modulator and an operation point of the second modulator so as to match the same null point in accordance with a change in a carrier frequency of the first modulated optical signal included in the polarization multiplexed optical signal and a change in a carrier frequency of the second modulated optical signal included in the polarization multiplexed optical signal;
a polarizer that is configured to have 45 degrees with respect to two polarizations of the polarization multiplexed optical signal; and
a detector that detects frequencies of the first modulated optical signal and the second modulated optical signal in accordance with an intensity of output light of the polarizer, wherein
when the phase rotation circuit multiplies the second electric field information signal by a first function for alternately adding a phase rotation of zero and a phase rotation of $\pi/2$ at specified time intervals, and multiplies the first electric field information signal by a second function for adding a phase rotation that corresponds to a specified carrier frequency shift, the detector detects a shift in the carrier frequency of the first modulated optical signal with respect to a frequency of the continuous wave light in accordance with the intensity of the output light of the polarizer when the phase rotation according to the first function is zero and in accordance with the intensity of the output light of the polarizer when the phase rotation according to the first function is $\pi/2$,
when the phase rotation circuit multiplies the first electric field information signal by the first function, and multiplies the second electric field information signal by the second function, the detector detects a shift in the carrier frequency of the second modulated optical signal with respect to the frequency of the continuous wave light in accordance with the intensity of the output light of the polarizer when the phase rotation according to the first function is zero and in accordance with the intensity of the output light of the polarizer when the phase rotation according to the first function is $\pi/2$, and
the controller controls a bias of the first modulator in accordance with a direction of the shift in the carrier frequency of the first modulated optical signal, and controls a bias of the second modulator in accordance with a direction of the shift in the carrier frequency of the second modulated optical signal.

12. A bias control method comprising:
generating an electric field information signal from transmission data;
adding a phase rotation to the electric field information signal;
generating a driving signal from the electric field information signal to which the phase rotation is added;
generating a modulated optical signal in accordance with the driving signal by using a modulator; and
controlling a bias of the modulator in accordance with a change in a carrier frequency of the modulated optical signal corresponding to the phase rotation added to the electric field information signal, wherein
in the adding, a phase rotation corresponding to an FSK (Frequency Shift Keying) signal that indicates a specified data pattern is added to the electric field information signal so as to superimpose the FSK signal on the driving signal,
the change in the carrier frequency of the modulated optical signal is monitored and the FSK signal superimposed on the modulated optical signal is detected, and
in the controlling, the bias of the modulator is changed when the FSK signal detected from the modulated optical signal is inverted with respect to the FSK signal superimposed on the driving signal.

\* \* \* \* \*